(12) United States Patent
Miller et al.

(10) Patent No.: US 11,792,041 B2
(45) Date of Patent: Oct. 17, 2023

(54) PRIVATE ALIAS ENDPOINTS FOR ISOLATED VIRTUAL NETWORKS

(71) Applicant: Amazon Technologies, Inc., Seattle, WA (US)

(72) Inventors: Kevin Christopher Miller, Herndon, VA (US); Richard Alexander Sheehan, Dublin (IE); Douglas Stewart Laurence, Mercer Island, WA (US); Marwan Salah El-Din Oweis, Olney, MD (US); Andrew Bruce Dickinson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 16/953,191

(22) Filed: Nov. 19, 2020

(65) Prior Publication Data

US 2021/0152392 A1    May 20, 2021

Related U.S. Application Data

(63) Continuation of application No. 16/377,062, filed on Apr. 5, 2019, now Pat. No. 10,848,346, which is a
(Continued)

(51) Int. Cl.
*H04L 12/46*    (2006.01)
*G06F 9/455*    (2018.01)
(Continued)

(52) U.S. Cl.
CPC ...... *H04L 12/4633* (2013.01); *G06F 9/45558* (2013.01); *H04L 63/0272* (2013.01);
(Continued)

(58) Field of Classification Search
CPC ............. H04L 12/4633; H04L 61/6059; H04L 61/6004; G06F 9/45558; G06F 2009/45595
See application file for complete search history.

(56) References Cited

U.S. PATENT DOCUMENTS 6,240,402 B1    5/2001    Lynch-Aird
6,581,090 B1*   6/2003    Lindbo ..................... H04L 9/40
                                                                709/217
(Continued)

FOREIGN PATENT DOCUMENTS

CN    102598591    7/2012
EP    1713231    10/2006
(Continued)

OTHER PUBLICATIONS

U.S. Appl. No. 13/239,159, filed Sep. 21, 2011, Eric J. Brandwine.
(Continued)

*Primary Examiner* — Michael R Vaughan
(74) *Attorney, Agent, or Firm* — Robert C. Kowert; Kowert, Hood, Munyon, Rankin & Goetzel, P.C.

(57) ABSTRACT

In accordance with a designation of a private alias endpoint as a routing target for traffic directed to a service from within an isolated virtual network of a provider network, a tunneling intermediary receives a baseline packet generated at a compute instance. The baseline packet indicates a public IP (Internet Protocol) address of the service as the destination, and a private IP address of the compute instance as the source. In accordance with a tunneling protocol, the tunneling intermediary generates an encapsulation packet comprising at least a portion of the baseline packet and a header indicating the isolated virtual network. The encapsulation packet is transmitted to a node of the service.

20 Claims, 10 Drawing Sheets

Related U.S. Application Data continuation of application No. 15/728,277, filed on Oct. 9, 2017, now Pat. No. 10,256,993, which is a continuation of application No. 14/491,758, filed on Sep. 19, 2014, now Pat. No. 9,787,499.

(51) Int. Cl.
  *H04L 9/40* (2022.01)
  *H04L 101/604* (2022.01)
  *H04L 101/659* (2022.01)

(52) U.S. Cl.
  CPC ............... *H04L 63/0428* (2013.01); *G06F 2009/45595* (2013.01); *H04L 63/10* (2013.01); *H04L 2101/604* (2022.05); *H04L 2101/659* (2022.05)

(56) References Cited

U.S. PATENT DOCUMENTS

| | | |
|---|---|---|
| 6,993,021 B1 | 1/2006 | Chuah et al. |
| 7,174,455 B1 | 2/2007 | Arnold et al. |
| 7,325,140 B2 | 1/2008 | Carley |
| 7,383,433 B2 | 6/2008 | Yeager et al. |
| 7,389,529 B1 | 6/2008 | Enderwick et al. |
| 7,440,415 B2 | 10/2008 | Wild, III et al. |
| 7,505,962 B2 | 3/2009 | Shariff et al. |
| 7,630,368 B2 | 12/2009 | Tripathi et al. |
| 7,634,584 B2 | 12/2009 | Pope et al. |
| 7,733,890 B1 | 6/2010 | Droux et al. |
| 7,792,140 B2 | 9/2010 | Droux et al. |
| 7,865,586 B2 | 1/2011 | Cohn |
| 7,912,082 B2 | 3/2011 | Yang et al. |
| 7,937,438 B1 | 5/2011 | Miller et al. |
| 7,945,640 B1 | 5/2011 | VanTine |
| 7,953,865 B1 | 5/2011 | Miller et al. |
| 7,961,726 B2 | 6/2011 | Wang et al. |
| 7,962,950 B2 | 6/2011 | Choo et al. |
| 7,984,066 B1 | 7/2011 | Kilday et al. |
| 7,991,859 B1 | 8/2011 | Miller et al. |
| 8,082,581 B2 | 12/2011 | Wu |
| 8,117,289 B1 | 2/2012 | Miller et al. |
| 8,131,852 B1 | 3/2012 | Miller et al. |
| 8,201,237 B1 | 6/2012 | Doane et al. |
| 8,209,749 B2 | 6/2012 | Babula et al. |
| 8,224,971 B1 | 7/2012 | Miller et al. |
| 8,230,050 B1 | 7/2012 | Brandwine et al. |
| 8,239,538 B2 | 8/2012 | Zhang et al. |
| 8,244,909 B1 | 8/2012 | Hanson et al. |
| 8,259,597 B1 | 9/2012 | Oak |
| 8,261,341 B2 | 9/2012 | Stirbu |
| 8,312,129 B1 | 11/2012 | Miller et al. |
| 8,331,371 B2 | 12/2012 | Judge et al. |
| 8,345,692 B2 | 1/2013 | Smith |
| 8,352,941 B1 | 1/2013 | Protopopov et al. |
| 8,369,345 B1 * | 2/2013 | Raghunathan .......... H04L 45/60 370/399 |
| 8,443,435 B1 | 5/2013 | Schroeder |
| 8,478,896 B2 | 7/2013 | Ehlers |
| 8,484,089 B1 | 7/2013 | Lin et al. |
| 8,543,734 B2 | 9/2013 | McDysan |
| 8,559,441 B2 | 10/2013 | Miyabe |
| 8,559,449 B2 | 10/2013 | Rao et al. |
| 8,612,599 B2 | 12/2013 | Tung et al. |
| 8,656,420 B2 | 2/2014 | Foster et al. |
| 8,705,394 B2 | 4/2014 | Venkatachalapathy et al. |
| 8,751,686 B2 | 6/2014 | Filsfils et al. |
| 8,751,691 B1 | 6/2014 | Brandwine et al. |
| 9,455,935 B2 | 9/2016 | Yu et al. |
| 9,524,167 B1 | 12/2016 | Cohn et al. |
| 9,787,499 B2 | 10/2017 | Miller et al. |
| 9,806,949 B2 | 10/2017 | Addanki et al. |
| 10,848,346 B2 | 11/2020 | Miller et al. |
| 2002/0026592 A1 | 2/2002 | Gavrila et al. |
| 2002/0073215 A1 | 6/2002 | Huitema et al. |
| 2002/0106985 A1 | 8/2002 | Sato et al. |
| 2003/0053441 A1 | 3/2003 | Banerjee |
| 2003/0084104 A1 | 5/2003 | Salem et al. |
| 2004/0078371 A1 | 4/2004 | Worrall et al. |
| 2005/0193103 A1 | 9/2005 | Drabik |
| 2005/0198244 A1 | 9/2005 | Eilam et al. |
| 2005/0198384 A1 | 9/2005 | Ansari et al. |
| 2006/0146870 A1 | 7/2006 | Harvey et al. |
| 2006/0262736 A1 | 11/2006 | Dong et al. |
| 2007/0239987 A1 | 10/2007 | Hoole et al. |
| 2008/0002703 A1 | 1/2008 | Tripathi et al. |
| 2008/0034200 A1 | 2/2008 | Polcha et al. |
| 2008/0080519 A1 | 4/2008 | Park et al. |
| 2008/0104393 A1 | 5/2008 | Glasser et al. |
| 2008/0225875 A1 | 9/2008 | Wray et al. |
| 2008/0267087 A1 | 10/2008 | Beck et al. |
| 2009/0129385 A1 | 5/2009 | Wray et al. |
| 2009/0190585 A1 | 7/2009 | Allen et al. |
| 2009/0205018 A1 | 8/2009 | Ferraiolo et al. |
| 2010/0049637 A1 | 2/2010 | Laventman et al. |
| 2010/0057831 A1 | 3/2010 | Williamson |
| 2010/0085984 A1 | 4/2010 | Shin et al. |
| 2010/0094990 A1 | 4/2010 | Ben-Yehuda et al. |
| 2010/0131949 A1 | 5/2010 | Ferris |
| 2010/0132012 A1 | 5/2010 | van Riel et al. |
| 2010/0246443 A1 | 9/2010 | Cohn et al. |
| 2010/0257276 A1 | 10/2010 | Savolainen |
| 2011/0047540 A1 | 2/2011 | Williams et al. |
| 2011/0072486 A1 | 3/2011 | Hadar et al. |
| 2011/0072487 A1 | 3/2011 | Hadar et al. |
| 2011/0075667 A1 | 3/2011 | Li et al. |
| 2011/0087888 A1 | 4/2011 | Rennie |
| 2011/0099616 A1 | 4/2011 | Mazur et al. |
| 2011/0132016 A1 | 6/2011 | Chandler et al. |
| 2011/0137947 A1 | 6/2011 | Dawson et al. |
| 2011/0145836 A1 | 6/2011 | Wheeler et al. |
| 2011/0251937 A1 | 10/2011 | Falk et al. |
| 2011/0251992 A1 | 10/2011 | Bethlehem et al. |
| 2011/0264906 A1 | 10/2011 | Pourzandi et al. |
| 2011/0320605 A1 | 12/2011 | Kramer et al. |
| 2012/0084113 A1 | 4/2012 | Brandwine et al. |
| 2012/0084443 A1 | 4/2012 | Theimer et al. |
| 2012/0099602 A1 | 4/2012 | Nagapudi et al. |
| 2012/0250682 A1 | 10/2012 | Vincent et al. |
| 2012/0281701 A1 | 11/2012 | Chen et al. |
| 2013/0031424 A1 | 1/2013 | Srivastava et al. |
| 2013/0227355 A1 | 8/2013 | Dake et al. |
| 2014/0006638 A1 | 1/2014 | Kavanagh et al. |
| 2014/0075048 A1 | 3/2014 | Yuksel et al. |
| 2014/0115584 A1 | 4/2014 | Mudigonda et al. |
| 2014/0241173 A1* | 8/2014 | Knight ............... H04L 43/0811 370/248 |
| 2014/0269705 A1 | 9/2014 | DeCusatis et al. |
| 2015/0100471 A1 | 4/2015 | Curry, Jr. et al. |
| 2015/0188802 A1 | 7/2015 | Yoon et al. |
| 2015/0339136 A1 | 11/2015 | Suryanarayanan et al. |
| 2015/0381495 A1 | 12/2015 | Cherian et al. |
| 2016/0020941 A1 | 1/2016 | Asati et al. |

FOREIGN PATENT DOCUMENTS

| | | |
|---|---|---|
| JP | 2001186191 A | 7/2001 |
| JP | 2004185440 A | 7/2004 |
| JP | 2013509090 A | 3/2013 |
| JP | 2014502066 | 1/2014 |
| WO | 2011049742 A2 | 4/2011 |
| WO | 2012047273 | 4/2012 |
| WO | 2012170016 | 12/2012 |

OTHER PUBLICATIONS

U.S. Appl. No. 13/149,516, filed May 31, 2011; Jacob Gabrielson.
Wikipedia, "Virtual Private Networks," Aug. 2008.
U.S. Appl. No. 13/339,985, filed Dec. 29, 2011, Eric W. Schultze.
U.S. Appl. No. 13/408,902, filed Feb. 29, 2012, Christopher Richard Jacques de Kadt.
U.S. Appl. No. 13/525,010, filed Jun. 15, 2012, Erik J. Fuller.

(56) References Cited

OTHER PUBLICATIONS

U.S. Appl. No. 14/274,534, filed May 9, 2014, Upendra Bhalchandra Shevade.
U.S. Appl. No. 14/083,005, filed Nov. 18, 2013, Matthew Shawn Wilson.
U.S. Appl. No. 12/825,212, filed Jun. 28, 2010, Alan M. Judge et al.
U.S. Appl. No. 13/252,712, filed Oct. 4, 2011, Richard H. Galliher III, et al.
Costin Raiciu, et al "Improving Datacenter Performance and Robustness with Multipath TCP" SIGCOMM'11, Aug. 15-19, 2011, pp. 1-12.
Albert Greenberg, et al "VL2: A Scalable and Flexible Data Center Network" Communications of the ACM, vol. 54, No. 3, Mar. 2011, pp. 1-10.
Chuanxiong Guo, et al "BCube: A High Performance, Server-centric Network Architecture for Modular Data Centers" SIGCOMM'09 Aug. 17-21, pp. 1-12.
U.S. Appl. No. 13/073,182, filed Mar. 28, 2011, Daniel T. Cohn, et al.
U.S. Appl. No. 14/274,546, filed May 9, 2014, Upendra Bhalchandra Shevade.
Amazon Web Services, AWS Direct Connect; User Guide API Version, Oct. 22, 2013, pp. 1-42.
Amazon Web Services, Amazon Virtual Private Cloud; User Guide API Version, Oct. 1, 2013, pp. 1-143.
U.S. Appl. No. 14/183,160, filed Feb. 18, 2014, Shuai Ye.
U.S. Appl. No. 14/192,476, filed Feb. 27, 2014, Shuai Ye.
U.S. Appl. No. 13/528,271, filed Jun. 20, 2012, Long X. Nguyen.
U.S. Appl. No. 14/274,477, filed May 9, 2014, Upendra Bhalchandra Shevade.
International Search Report and Written Opinion from PCT/US2015/051027, dated Jan. 4, 2016, Amazon Technologies, Inc., pp. 1-14.
"Amazon Virtual Private Cloud User Guide", Amazon Web Services, API Version, Apr. 15, 2015, pp. 1-201.
"IP tunnel", Wikipedia, Retrieved from URL: https://en.wikipedia.org/w/index.php?title=IP_tunnel&oldid=585545977, Retrieved on Dec. 12, 2015, pp. 1-2.
"Amazon Virtual Private Cloud User Guide", Amazon Web Services, API Version Feb. 1, 2014, pp. 1-152.
Office Action from Japanese Patent Application No. 2017-513782, dated May 8, 2018 (English translation & Japanese Version), Amazon Technologies, Inc , pp. 1-11.
U.S. Appl. No. 15/179,739, filed Jun. 10, 2016, Eric W, Schultze.
U.S. Appl. No. 15/154,818, filed May 13, 2016, Eric Jason Brandwine.
U.S. Appl. No. 14/548,196, filed Nov. 19, 2014, Edward Max Schaefer.
U.S. Appl. No. 15/823,185, filed Nov. 27, 2017, Kevin Christopher Miller.
U.S. Appl. No. 14/658,965, filed Mar. 16, 2015, Weili Zhang Mcclenahan.
U.S. Appl. No. 14/736,165, filed Jun. 10, 2015, Calm Maccarthaigh.
U.S. Appl. No. 16/029,468, filed Jul. 6, 2018, Kyle Tailor Akers.
U.S. Appl. No. 14/853,646, filed Sep. 14, 2015, Po-Chun Chen.
U.S. Appl. No. 16/056,078, filed Aug. 6, 2018, Unknown.
U.S. Appl. No. 15/439,751, filed on Mihir Sadruddin Surani.
U.S. Appl. No. 15/632,258, filed on Benjamin David Strauss.
U.S. Appl. No. 15/435,138, filed Feb. 16, 2017, Daniel Todd Cohn.
U.S. Appl. No. 15/702,589, filed Sep. 12, 2017, Kevin Christopher Miller.
U.S. Appl. No. 14/822,704, filed Aug. 10, 2015, Daniel T. Cohn.
U.S. Appl. No. 14/853,608, filed Sep. 14, 2015, Eric Jason Brandwine.
U.S. Appl. No. 13/829,721, filed Mar. 14, 2013, Eric Jason Brandwine.
U.S. Appl. No. 15/382,403, filed Dec. 16, 2016, Daniel Todd Cohn.
U.S. Appl. No. 15/011,302, filed Jan. 29, 2016, Eric Jason Brandwine.
U.S. Appl. No. 15/996,371, filed Jun. 1, 2018, Eric Jason Brandwine.
U.S. Appl. No. 15/663,592, filed Jul. 28, 2017, Kevin Christopher Miller.
U.S. Appl. No. 14/067,756, filed Oct. 30, 2013, Daniel T. Cohn.
U.S. Appl. No. 15/061,851, filed Mar. 4, 2016, Eric Jason Brandwine.
Masahiro Satou, et al., "Server Side Networking for Cloud Data Centers", 2012 IEEE 1st International Conference on Cloud Networking (CLOUDNET), Nov. 28, 2012, pp. 17-22.
Notice of Allowance dated Apr. 12, 2022 in Japanese patent application No. 2020-204851.
Kapil Bakshi, "Considerations for Software Defined Networking (SDN): Approaches and Use Cases", Aerospace Conference, 2013 IEEE, Mar. 2, 2013, pp. 1-9.
Office Action dated Aug. 3, 2022 in Chinese Patent Application No. 202110183914.6, Amazon Technologies, Inc., pp. 1-14 (including translation).

\* cited by examiner

```
┌─────────────────────────────────────────────────────────────────────┐
│ Configure one or more isolated virtual networks (IVNs) for a client │
│ C1 using provider network resources, with each IVN comprising one   │
│ or more compute instances; internal network configuration (e.g.,    │
│ subnet setup, IP address assignment for the instances) for the IVNs │
│ is performed by C1    801                                           │
└─────────────────────────────────────────────────────────────────────┘
                                  │
                                  ▼
┌─────────────────────────────────────────────────────────────────────┐
│ Create a metadata record (e.g., at C1's request) representing a     │
│ private alias endpoint PAE1 to be indicated as a routing target for │
│ traffic directed from instances with private IP addresses at a      │
│ particular IVN (IVN1) to a service implemented elsewhere in the     │
│ provider network    804                                             │
└─────────────────────────────────────────────────────────────────────┘
                                  │
                                  ▼
┌─────────────────────────────────────────────────────────────────────┐
│ Assign a particular service Svc1 (from among a set of registered    │
│ services that advertise public addresses for accessing service      │
│ resources and have been verified as supporting PAE-based access) to │
│ PAE1, e.g., as an attribute    807                                  │
└─────────────────────────────────────────────────────────────────────┘
                                  │
                                  ▼
┌─────────────────────────────────────────────────────────────────────┐
│ Assign access policy or policies (e.g., either a default policy, or │
│ one or more client-specified policies) to PAE1, indicating the      │
│ kinds of operations permitted/prohibited in service requests        │
│ submitted to Svc1 using PAE1, the objects accessible, applicable    │
│ time periods, principals, etc.    810                               │
└─────────────────────────────────────────────────────────────────────┘
                                  │
                                  ▼
┌─────────────────────────────────────────────────────────────────────┐
│ Create/attach route table entry for one or more subnets of IVN1     │
│ indicating PAE1 as a route target for packets with Svc1 as the      │
│ specified destination    813                                        │
└─────────────────────────────────────────────────────────────────────┘
                                  │
                                  ▼
┌─────────────────────────────────────────────────────────────────────┐
│ Update/propagate PAE configuration information (and/or lists of Sv1 │
│ public IP addresses) to virtualization management components and/or │
│ tunneling intermediaries                                            │
│                              816                                    │
└─────────────────────────────────────────────────────────────────────┘
```

FIG. 8

PRIVATE ALIAS ENDPOINTS FOR ISOLATED VIRTUAL NETWORKS

This application is a continuation of U.S. patent application Ser. No. 16/377,062, filed on Apr. 5, 2019, which is a continuation of U.S. patent application Ser. No. 15/728,277, filed Oct. 9, 2017, now U.S. Pat. No. 10,256,993, which is a continuation of U.S. patent application Ser. No. 14/491,758, filed Sep. 19, 2014, now U.S. Pat. No. 9,787,499, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers.

A few providers allow their customers to create logically isolated networks using resources located at such data centers. For example, a customer may be assigned some set of virtualized servers and/or other resources implemented at hosts managed by the provider, and the customer may be afforded substantial flexibility with respect to the networking configuration of the resources. The customer may, for example, select IP (Internet Protocol) addresses to the servers, define subnets of their choice, and so on. Such customer-configurable networks implemented using provider resources may be referred to by a variety of names, including "isolated virtual networks" or "virtual private clouds". In some scenarios, customers may assign private IP addresses (i.e., addresses that are not visible or advertised outside the isolated virtual networks) to some resources within an isolated virtual network, e.g., without having to be concerned about the uniqueness of the addresses with respect to resources outside the isolated virtual network. The provider may support high levels of security, network isolation, and availability in such environments, enabling customers to run business-critical applications in the isolated virtual networks and experience a similar (or higher) quality of service to that achievable at customer-owned premises.

At least some providers that support isolated virtual networks may also implement a variety of other services, such as storage services, database services, and the like. Some of these other services may be designed to be accessible from the public Internet—e.g., a set of publicly-advertised IP addresses or corresponding URIs (uniform resource identifiers) may be set up for clients to access resources of such a service. At least in some environments, it may not be straightforward for customers that wish to access such publicly-advertised services from within their highly secure isolated virtual networks to do so without either potentially reducing security or incurring substantial costs.

BRIEF DESCRIPTION OF DRAWINGS

FIG. 8 is a flow diagram illustrating aspects of operations that may be performed to configure PAEs, according to at least some embodiments.

Figure 1:
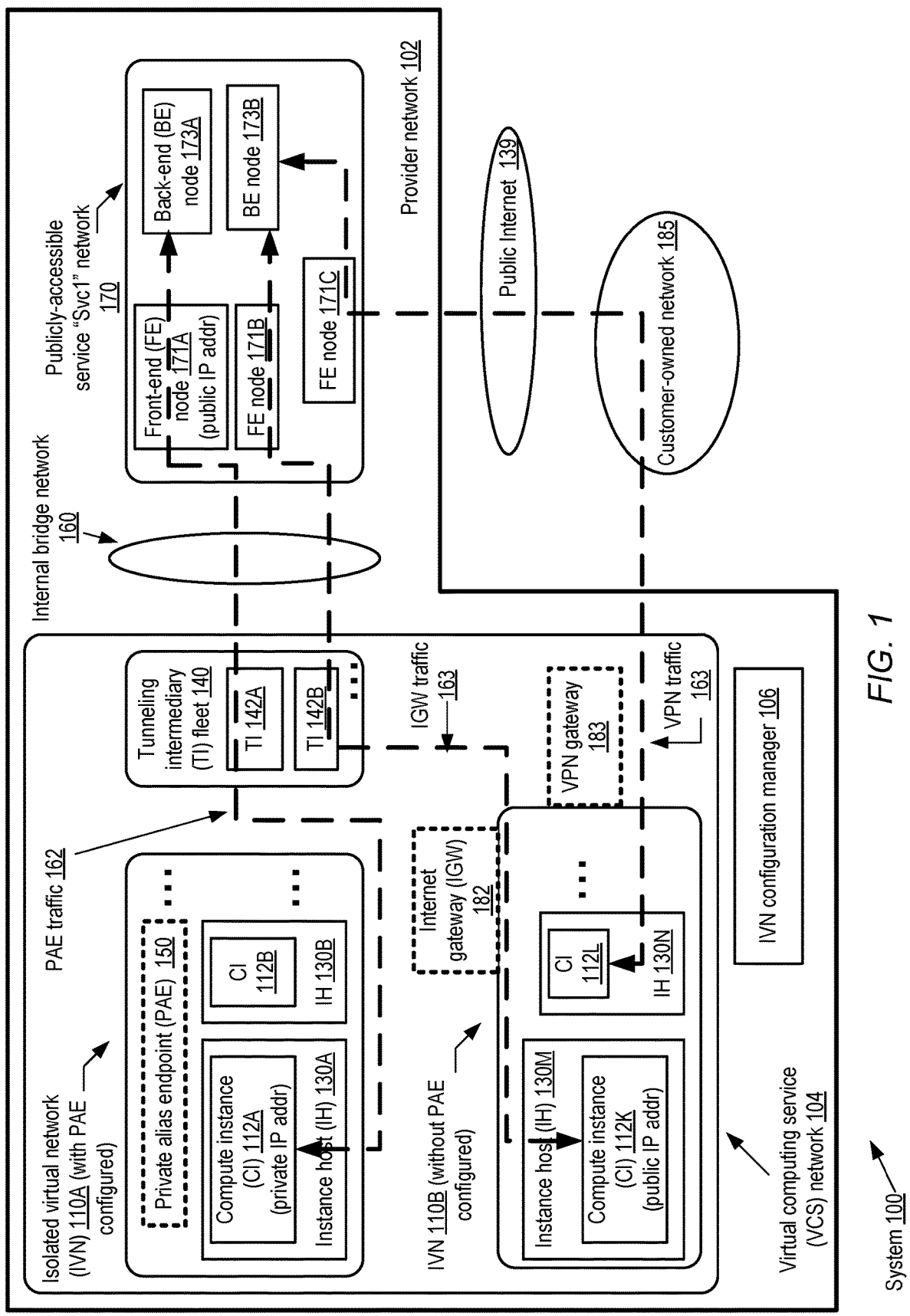
FIG. 1 illustrates an example system environment in which private alias endpoints (PAEs) may be established to enable routing of network traffic between isolated virtual networks (IVNs) of a provider network and one or more publicly-accessible services without assigning public IP addresses at the IVNs and without traversing customer networks, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for supporting private alias endpoints (PAEs) at a provider network are described. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. At least some provider networks may also be referred to as "public cloud" environments. A given provider network may include numerous data centers hosting various resource pools, such as collections of physical and/or virtualized computer servers, storage devices, networking equipment and the like, needed to implement, configure and distribute the infrastructure and services offered by the provider. In at least some embodiments, a virtual computing service implemented at a provider network may enable clients to utilize one or more guest virtual machines (which may be referred to herein as "compute instances" or simply as "instances") for their applications, with one or more compute instances being executed on an instance host of a large fleet of instance hosts. Within large provider networks, some data centers may be located in different cities, states or countries than others, and in some embodiments the resources allocated to a given application may be distributed among several such locations to achieve desired levels of availability, fault-resilience and performance.

In at least some embodiments, a provider network may enable customers to request the establishment of "isolated virtual networks" (IVNs) at the provider's data centers. An IVN (which may also be referred to in some environments as a "virtual private cloud" or VPC) may comprise a collection of computing and/or other resources in a logically isolated section of the provider network, over which the customer is granted substantial control with respect to networking configuration. In some embodiments, for example, a customer may select the IP (Internet Protocol) address ranges to be used for the IVN resources such as various compute instances, manage the creation of subnets within the IVN, and the configuration of route tables etc. for the IVN. For at least some of the devices within an IVN in some embodiments, the IP addresses may not be visible outside the IVN, at least by default. Such IP addresses may be referred to herein as "private" IP addresses, in contrast to "public" IP addresses that are accessible from the public Internet as a result of being directly or indirectly advertised on the public Internet via BGP (the Border Gateway Protocol) or other similar protocols. The use of private addresses may enable clients to protect their applications from potential attacks originating from the Internet, for example. IVN support may be one of the features of a more general virtual computing service (VCS) of a provider network in some embodiments. For example, the VCS may also support reservation or allocation of compute instances that are not part of an IVN, and for which the VCS (rather than the client to whom the instances are allocated) performs much or all of the networking configuration required.

At least some of the services implemented in a provider network, such as one or more storage services or database services, may be publicly accessible. That is, some set of IP addresses (or corresponding hostnames/URIs) that can be used to access a service may be publicly advertised, and a client may therefore be able to submit service requests to such a service from a device that has connectivity to the Internet. For example, a storage service named "SvcX" may be accessible by a client via a publicly advertised URI such as https://SvcX.<providername>.com, and the IP address for such a service may be obtained from one or more Domain Name Service (DNS) servers.

Some applications that are run within an IVN on behalf of a client may require access to such publicly-accessible services. For example, an e-commerce application running on a client's compute instance in an IVN may need to read or write data to publicly-accessible storage service of the provider network. One way to establish connectivity to a publicly-accessible service may involve assigning one or more public IP addresses to resources within the IVN (and/or setting up an Internet-accessible gateway for the IVN), which may be a practice somewhat counter to the isolation and security requirements of the IVN client. Another way to establish connectivity between compute instances running in the IVN and resources of a publicly-accessible service may be to first establish a VPN (virtual private network) connection between the IVN and a customer network, and then send traffic indirectly from the IVN to the publicly-accessible service via the customer network. At least in some environments, however, such VPN-based connectivity may be fairly expensive, and the indirect paths used for the traffic may not necessarily be fast enough (e.g., with respect to end-to-end latency) to meet client application requirements.

Accordingly, in order to facilitate efficient connectivity between IVN resources and at least some publicly-accessible services, in some embodiments a provider network operator may support the establishment of private alias endpoints for IVNs. As the name implies, a PAE may serve as a "virtual" endpoint representing a publicly-accessible service, and the PAE may be "private" in that its use does not require an assignment of a public network address to any entity within the IVN. PAEs may also be referred to as "virtual private endpoints" in some environments. In at least some embodiments, a PAE may enable an application running within an IVN set up on behalf of a client to send service requests to (and receive responses from) publicly-accessible services implemented elsewhere within the provider network, e.g., without having to expose the IVN to the public Internet and without traversing network links outside the provider network. A tunneling protocol may be used as described below to encapsulate packets of traffic originating at the IVN for transmission to the portion of the provider network in which the publicly-accessible service is implemented. Neither the client applications running in the IVN, nor the resources of the publicly-accessible service that implement client service requests, need necessarily even be made aware of the use of the tunneling protocol in various embodiments. That is, in such embodiments, no changes may be required to client applications or to the logic involved in serving client requests at service resources.

In at least one embodiment, the establishment of a PAE may involve the client performing a few additional steps of IVN configuration, very similar in ease-of-use to the kinds of steps that are typically required for other aspects of IVN networking configuration performed by the client. The client may, for example, request the creation of a PAE for an IVN via a programmatic management/administration interface (e.g., a console or an application programming interface (API)), and then associate the PAE with a selected service identified by a user-friendly service name. The client may then specify the PAE, e.g., in a route table set up for one or more subnets of an IVN, as a target for traffic whose destination is any node or resource of the publicly-accessible service in some embodiments. In some implementations, a generic alias (such as a service name "Svc1") may be used to indicate the service as the destination in the route table, and an identifier assigned to the PAE may be indicated as the target. In such implementations, the client may not have to identify any IP addresses for the service when specifying the destination. In at least some embodiments, a client may set up several different PAEs at a given IVN, e.g., to enable access to a number of different services implemented outside the IVN.

After a PAE has been configured and indicated as the target for traffic intended for a service from a particular IVN, a client application running on a compute instance of the IVN (where the compute instance has been assigned a private IP address and no public IP address) may issue requests to the service analogously to the way that such requests would be issued from an Internet-connected device.

For example, a DNS request may be issued from the compute instance (e.g., to a DNS server of the provider network) to obtain a public IP address of the service. The application may submit a service request using a web service API (or any similar programmatic interface supported by the service), which may be converted by the operating system or other components of the compute instance into one or more baseline packets with the service's public IP address as the destination and the instance's private IP address as the source.

As mentioned earlier, a compute instance may be implemented as a guest virtual machine running on an instance host. In at least some embodiments, the instance host may include various components of a virtualization management software stack, such as a hypervisor and/or a privileged operating system instance (often termed a "dom-0" or domain zero instance). Such a virtualization management component (which may be referred to herein as a VMC) may be responsible for translating resource requests issued at the guest virtual machines into physical operations performed at hardware resources. In one embodiment, a VMC running at the instance host may intercept a baseline packet issued from the compute instance, and the VMC may be responsible for determining how (or if) the baseline packet should be transformed for transmission over a physical network to which the instanced host is attached. In some implementations, the VMC may have access to IVN metadata records indicating the selection of the PAE as a target for traffic directed to the service, and may also have access to a list of public IP addresses of the service. The VMC may therefore be able to determine that the intercepted baseline packet is to be transmitted to a service associated with a PAE.

In at least some embodiments, various services (including the virtual computing service at which the IVNs are configured, and the destination service assigned to the PAE) may be assigned to respective logically distinct portions of the provider network. Traffic between given pairs of the services may have to traverse a bridge network (which may also be referred to as a border network) to reach a destination service from a source service. Such bridge networks may also be considered special-purpose subsets of the provider network, just as the source and destination service networks may be considered subsets of the provider network. As the name implies, bridge networks may serve as intermediary networks between various logically distinct portions of the provider network (and, in some cases, as intermediaries between the provider network and external networks). The VMC may not have direct access to a bridge network that is to be traversed to reach the destination service, and may therefore require the use of an intermediary capable of routing packets on to such a bridge network. In at least some embodiments, accordingly, the VMC may deliver the contents of the baseline packet to a tunneling intermediary, e.g., in a first encapsulated version of the packet. This first encapsulation packet may then be transformed in accordance with a selected tunneling protocol by the tunneling intermediary, and a second encapsulation version of the packet may be transmitted via a bridge network path or tunnel to a node of the destination service. Any of a variety of different encapsulation approaches may be used for either phase of encapsulation in various embodiments; some specific examples of encapsulation techniques are described in further detail below.

In one embodiment, the header or headers added by the tunneling intermediary may include encodings or representations of the source IVN and/or the PAE associated with the destination service. In one implementation, for example, the tunneling protocol may involve the encapsulation of IPv4 baseline packets within IPv6-compatible packet formats, in which some of the IPv6 address bits are used to encode IVN and/or PAE identifiers. At the destination service, the contents of the baseline packet (including, for example, the service request, and the private IP address of the source compute instance) may be extracted from the encapsulated version, together with the identifiers of the IVN and/or the PAE. In some embodiments, the IVN or PAE identifier may be useful in distinguishing between source compute instances (at different IVNs) to which the same private IP addresses may have been assigned, as described below in further detail. The requested operations indicated in a baseline packet body may be performed and a response may be returned to the requesting application at the source instance host, e.g., using similar types of tunneling and encapsulation techniques in the reverse direction.

Clients may be able to apply access control policies to PAEs in at least some embodiments, e.g., using the kinds of management programmatic interfaces mentioned earlier. An access control policy may, for example, indicate the types of operations or service requests that are permitted (or prohibited), the objects (e.g., files or directories at a storage-related service) on which the operations are permitted/prohibited, time periods (e.g., specific hours of the workday) for which the policy applies, principals (e.g., specific users or groups) to whom the policy applies, and so on. In some embodiments in which such policies are assigned to PAEs, the requests extracted from the encapsulation packets at the service may be checked to ensure that they do not violate applicable policies. In other embodiments, potential policy violations may be checked at the IVN side instead of, or in addition to, being checked at the destination service—e.g., a VMC may abort the transmission of a request if it determined that the request violates a policy associated with the PAE to be used.

In one embodiment, PAEs may be used not just for routing packets between IVNs and services implemented by the provider network, but also for routing packets between IVNs and third party services that are implemented elsewhere in the provider network. In such an embodiment, a third party (e.g., another customer of the provider network's virtual computing service) may set up a service using some set of provider network resources, and advertise public IP addresses at which the service can be accessed. The third party provider may register their service for PAE access, e.g., by submitting a request to a configuration manager of the provider network. The configuration manager may verify that the candidate third party service is capable of supporting access via routes for which PAEs are indicated as targets. For example, the configuration manager may initiate the assignment of front-end nodes that are capable of implementing the tunneling protocol (such as intelligent load balancers) to the third party service in some embodiments. In other embodiments, if the third party service operator has already set up nodes that are intended to implement the tunneling protocol, the capabilities of such nodes may be verified. After the third party service has been registered, and front-end nodes that can extract (de-capsulate) and encapsulate packets in accordance with the tunneling protocol have been set up, clients may configure PAEs at their IVNs to access the third party service. For example, a name or alias of the third party service (e.g., "ThirdPartySvc1") may be added to a list of service destination options (e.g., "StorageSvc1", "DBSvc1" etc., representing publicly-accessible services that are already configured for PAE support) than can be associated with PAEs by clients using programmatic interfaces.

Example System Environment

FIG. 1 illustrates an example system environment in which private alias endpoints (PAEs) may be established to enable routing of network traffic between isolated virtual networks of a provider network and one or more publicly-accessible services without assigning public IP addresses at the IVNs and without traversing customer networks, according to at least some embodiments. As shown, system 100 comprises a provider network 102 at which a plurality of services including a virtual computing service (VCS) and a publicly-accessible service Svc1 (i.e., a service that enables its clients to submit requests via publicly-advertised IP addresses or URIs) are implemented. Publicly-accessible service Svc1 may comprise, for example, a storage service providing web-service-based access to arbitrarily-sized storage objects, a non-relational database service, a relational database service, a notification service, a message queue service, or any of a variety of other types of services. Each of these services may comprise a plurality of hosts, storage devices and other computing equipment that collectively form a logically separate portion of provider network, e.g., with its own administrative or control-plane layer. In FIG. 1, for example, the resources of the VCS are located within VCS network 104, while the resources of Svc1 are located within Svc1 network 170.

Within the VCS network 104, a number of different isolated virtual networks (IVNs) 110 such as IVN 110A and IVN 110B may be established on behalf of various clients. The client on whose behalf a given IVN 110 is established may be granted substantial flexibility with respect to the networking configuration of the IVN—e.g., the client may assign desired IP addresses to various compute instances 112 without having to ensure that the IP addresses do not overlap with others in use outside the IVN, set up subnets, populate route tables, and so on. As shown, each IVN may include a plurality of instance hosts (IH) 130, such as IH 130A and 130B in IVN 110A, and IH 130M and 130N in IVM 110B. One or more compute instances (CIs) 112 may be instantiated at each IH 130, such as CI 112A at IH 130A, CI 112B at IH 130B, CI 112K at IH 130M, and CI 112L at IH 130N. Each of the compute instances may be used for one or more client applications or application subcomponents.

In the embodiment shown in FIG. 1, service Svc1 comprises at least two layers of resources: front-end (FE) nodes 171 (such as load balancers and/or request routers) that are configured to receive incoming service requests and transmit outbound service responses, and back-end (BE) nodes 173 at which the service's logic for fulfilling the service requests is implemented. At least some of the FE nodes, such as FE nodes 171A, 171B, and 171C may have public IP addresses assigned to them, thus making Svc1 publicly accessible, e.g., to devices of the public Internet 139 and to Internet-connected devices at customer-owned networks such as network 185.

In the depicted embodiment, a private alias endpoint (PAE) 150 has been established at IVN 110A, e.g., to enable Svc1-related packets to flow between CI 110A (which has a private IP address that is not directly accessible from the public Internet) and the Svc1 network 170, without requiring CI 110A to have a public IP address assigned to it, and without requiring the traffic to pass through a customer-owned network 185 or links of the public Internet 139. As described below in further detail, a route table entry for IVN 110A may be set up in some embodiments to indicate that traffic originating at one or more subnets of IVN 110A (including the subnet in which CI 110A is configured) and destined for Svc1 should be targeted to PAE 150. This route table entry, as well as other metadata such as a list of Svc1's public IP addresses, may be available to a virtualization management component (VMC) (e.g., a hypervisor component) running on each of the instance hosts 130 of IVN 110A in at least some embodiments. IVN configuration manager 106 may implement one or more programmatic interfaces (such as application programming interfaces (APIs), web-based consoles, command line tools, or graphical user interfaces and the like) enabling clients to request the creation of PAEs, the association of specific services with PAEs, the creation or modification of route table entries for an IVN, and so on.

The VMC at instance host 130A may intercept an outbound baseline network packet generated at a CI 112A and containing a service request directed to Svc1. (It is noted that some service requests and their associated request parameters may require more than one packet. To simplify the presentation, a service request is assumed to fit in a baseline packet in the following discussion. The tunneling technique described herein for such service requests may also be used for service requests that cross packet boundaries in various embodiments.) The service request may be formatted in accordance with any appropriate interface supported by Svc1, such as HTTP (HyperText Transfer Protocol), HTTPs (secure HTTP), XML (Extensible Markup Language), or the like. The baseline packet may indicate the private IP address of the CI as the source and a public IP address of Svc1 as the destination. The VMC may generate a first encapsulation packet from the baseline packet in accordance with a first encapsulation protocol in the depicted embodiment. Within the first encapsulation packet, in some implementations the baseline packet may be included in the body, while one or more additional headers of the first encapsulation protocol may comprise (among other information) an indication that the packet contains PAE traffic. The first encapsulation packet may be transmitted, as indicated by the dashed arrow for PAE traffic 162, from the instance host 112A to a tunneling intermediary (TI) such as TI 142A of a fleet of tunneling intermediaries 140 in the depicted embodiment. The TI fleet 140 (which may comprise a plurality of computing devices set up as TIs, such as TI 142A, 142B, and so on) may have been established to allow traffic to flow between the VCS network 104 and a variety of other logically separated networks of the provider network, including Svc1's network 170. Tunneling intermediaries may comprise special-purpose computing devices optimized for network-related processing in some embodiments. In other embodiments, a tunneling intermediary may comprise a process or thread of execution at a general-purpose computing device.

In at least some embodiments, upon receiving the first encapsulation packet, TI 142A may extract the contents of the baseline packet as well as the headers added by the VMC. In one embodiment, the TI 142A may utilize a mapping database associated with a particular tunneling protocol to generate different source and destination addresses from the baseline packet's source and destination addresses respectively. For example, in one implementation, the baseline packets source and destination IP addresses may be formatted according to IPv4 (version 4 of the Internet Protocol), and the TI 142A may replace them with longer, IPv6 (Internet Protocol version 6) addresses for a second encapsulation packet to be sent to the Svc1 network 170 via an internal bridge network 160. The internal bridge network 160 may be used as a path for cross-service traffic in the provider network, e.g., for traffic that is destined for publicly-accessible services from the virtual computing service.

In some embodiments the internal bridge network 160 may be referred to as a border network and may also be used for traffic flowing between the public Internet and the virtual computing service.

In one implementation, at TI 142A, the baseline packet's source IP address may be used as a key in the mapping database to look up the corresponding source address to be used in the outbound second encapsulation packet. Similarly, the baseline packet's destination IP address may be used as a key in the mapping database to look up the corresponding destination address to be used in the outbound second encapsulation packet in such an implementation. In at least some embodiments, using a larger number of bits for the source and destination addresses for the second encapsulation packet may enable the TI 142A to include an encoding of the identifier of the source IVN (e.g., IVN 110A in the case of packets originating at CI 112A) and/or the identifier of the PAE (e.g., PAE 150) in the second encapsulation packet. In some embodiments, the identifier of the PAE and/or the IVN may be included in the headers added by the VMC in the first encapsulation packet, and the TI 142 may obtain the identifiers from such headers. In other embodiments, the source and destination addresses obtained from to the mapping database may comprise the encoded identifiers of the IVN and/or the PAE.

The second encapsulation packet, generated at TI 142A, may be transmitted via the bridge network 160 to a front-end node 171 (e.g., 171A) of the destination service Svc1. The front-end node 171 may be able to perform de-capsulation in accordance with the tunneling protocol to extract contents of the baseline packet (including the source CI private IP address), as well as the identifier of the source IVN (e.g., IVN 110A) and/or the identifier of the PAE (e.g., PAE 150) used for routing. In at least some embodiments, the identification of the PAE and/or the source IVN may enable Svc1 nodes to distinguish between service requests from different compute instances with the same source private IP address, as described below in further detail. The service request indicated in the baseline packet may be passed on to a back-end node 173 (e.g., 173A) for processing. After the request has been processed, a baseline response packet may be generated at the back-end node, encapsulated in accordance with the tunneling protocol, and transmitted in the reverse direction back towards the source of the request (CI 112A). A TI 142 (e.g., either TI 142A or a different TI) may receive the encapsulated response via the internal bridge network 160, generate a modified encapsulation version using the first encapsulation protocol, and transmit it to the VMC at IH 130A. The VMC may extract the baseline response packet and provide it to the source CI 112A.

It is noted that while two different encapsulation protocols have been discussed above, in some embodiments only a single encapsulation protocol may be required or used to facilitate traffic between compute instances and publicly accessible services. For example, in one such embodiment, VMCs may be capable of implementing the tunneling protocol that is used for traffic over the internal bridge network, and thus the VMCs themselves may act as tunneling intermediaries. In such an embodiment, a VMC may intercept packets with the publicly-accessible service associated with a PAE 150 as the destination, generate an encapsulated packet that contains an encoding of the source IVN and/or the PAE, and transmit the encapsulated packet on to a bridge network device.

By using a PAE as a target in a route table entry for traffic directed towards Svc1, the client may be able to avoid two other approaches towards routing traffic between IVNs and Svc1, both of which are also illustrated in FIG. 1. In one approach, a client on whose behalf IVN 110B is set up may decide to establish an Internet gateway 182 for their IVN and/or to assign a public IP address (which can be accessed from the public Internet) to one of their instances such as CI 112K. In such a scenario, baseline packets containing Svc1 requests generated at CI 112K may be transmitted to Svc1 nodes (e.g., FE node 171B) without using the kind of tunneling protocol described above, e.g., via a path similar to path 163 indicated for Internet gateway (IGW) traffic. In some cases, the path used for traffic originating at a public IP address may comprise links 139 of the public Internet. One potential advantage of using the PAE approach over using the Internet gateway approach is that IVN 110B may be more vulnerable (by virtue of exposing public IP addresses) to attacks from the public Internet than IVN 110A (to which no public IP addresses have to be assigned).

In a second alternative to the use of PAEs, a client may establish a VPN (Virtual Private Network) gateway 183 to provide secure connectivity between an IVN 110B and a customer-owned network 185. Packets that are directed to Svc1 from an instance such as CI 112L may first be sent to the customer-owned network 185, and then sent (e.g., via public Internet links 139) to Svc1 nodes (such as FE node 171C). It is noted that an IVN such as 110B that has a VPN gateway 185 established need not utilize public IP addresses and need not have an Internet gateway 182 set up, and a client that uses only a VPN gateway may thereby avoid the security vulnerabilities mentioned above. However, in many cases, using a VPN connection to an external network for traffic that originates within the provider network (e.g., at an instance within an IVN) and is targeted to a destination within the provider network (e.g., a Svc1 node) may be inefficient in several ways. For example, in at least some embodiments, in comparison with the PAE approach, higher latencies may be encountered, lower throughput may be sustainable, and/or higher billing costs may result if the VPN approach is used. Although three separate FE nodes 171A, 171B and 171C are shown in FIG. 1, corresponding respectively to the three alternative routing approaches (i.e., routing using PAEs, routing using public IP addresses as source IP addresses, and routing using VPNs) discussed above, in at least some embodiments any given FE node may be able to handle traffic transmitted using any of the alternatives. Thus, the illustration of three FE nodes is not meant to imply that respective sets of FE nodes are required for the different connectivity alternatives.

In one embodiment, the virtual computing service may provide a service connectivity library (SCL) exposing a set of APIs that can be invoked to access publicly-accessible services using PAEs from applications running on the compute instances of an IVN. In such a scenario, an application may issue an API call indicating a target service Svc1, where the contents of a service request are indicated by parameters of the API call. The SCL may determine that the application intends to submit the service request to Svc1, and may initiate the implementation of the appropriate encapsulation necessary to transmit the service request to Svc1. Thus, instead of using the traditional approach in which the application initiates the generation of a baseline packet, the work of creating packets from service requests may be handled by the SCL. In some such embodiments, the application need not even obtain a particular public IP address of the target service; for example, the destination of the service request may be indicated by a service name rather than by a specific network address. In one embodiment, even if the application indicates a particular target public address of the service in the API call, the SCL may transmit an encapsulated version of the service request to a different public or private IP address of the target service (as long as the actual destination selected by the SCL is capable of responding appropriately to the service request).

Packet Flow Examples

Figure 2:
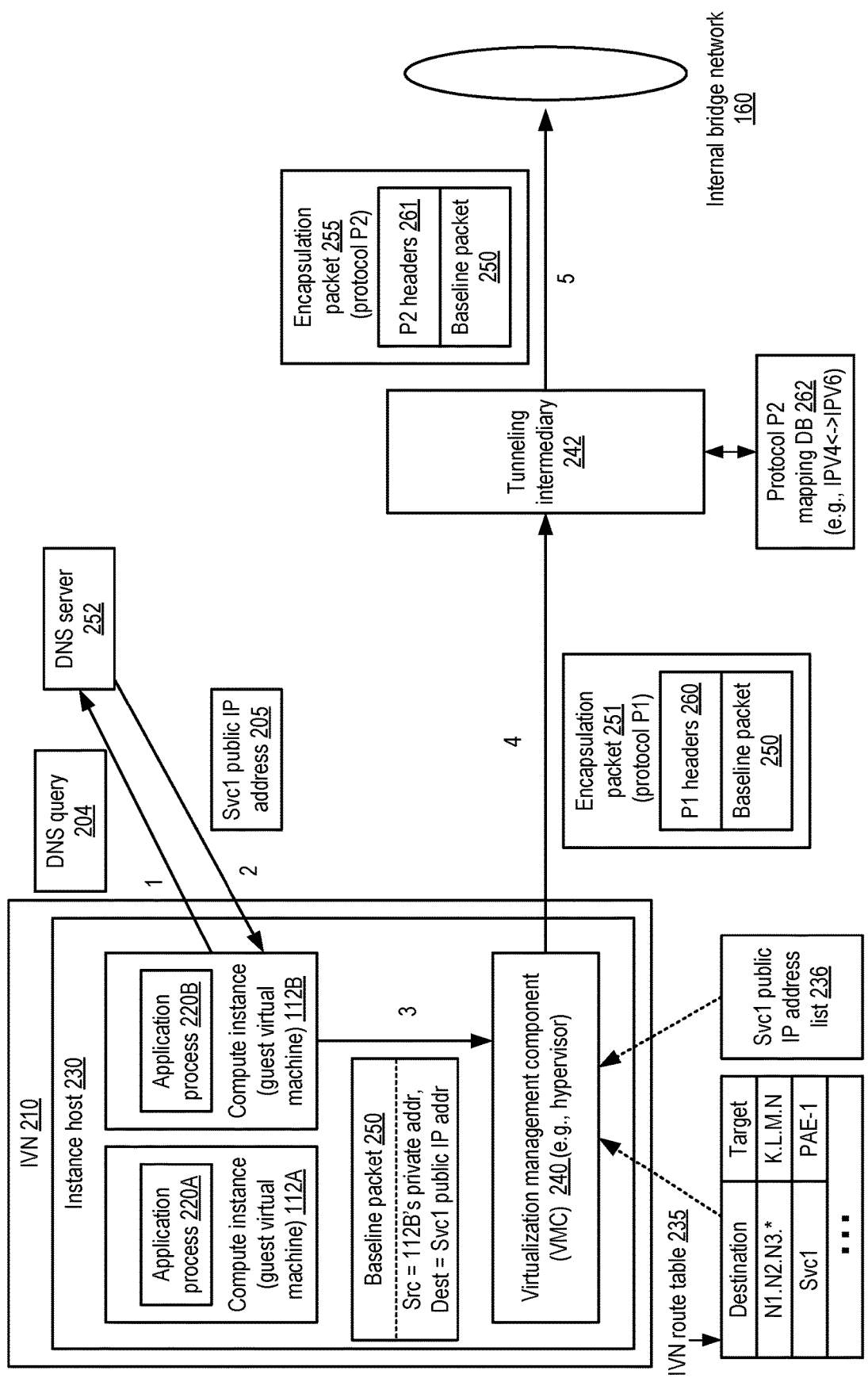
FIG. 2 illustrates example components involved in directing a packet originating at a compute instance of an isolated virtual network towards a destination at a publicly-accessible service, according to at least some embodiments.

FIG. 2 illustrates example components involved in directing a packet originating at a compute instance of an isolated virtual network towards a destination at a publicly-accessible service, according to at least some embodiments. As shown, instance host 230 of IVN 210 may comprise a plurality of compute instances 112, such as instances 112A and 112B. Each instance 112 may comprise a respective operating system instance running on a guest virtual machine. One or more components of client applications may be run at each compute instance, such as application process 220A at compute instance 112A and application process 220B at compute instance 112B. Interactions between the compute instances and the hardware components of the instance hosts (such as network interface cards or NICs that are used for network traffic) may be managed by one or more virtualization management components (VMCs) such as VMC 240. A VMC may, for example, include a hypervisor and/or a privileged operating system instance (which may sometimes be referred to as a domain zero or dom0 operating system instance).

At least some of the applications may require access to (e.g., may submit service requests to, and may receive service responses from) one or more services implemented outside the IVN in the depicted embodiment. For example, application process 220B may require access to a publicly-accessible service Svc1. Accordingly, as indicated by the arrow labeled "1" in FIG. 2, a DNS query 204 may be submitted from the compute instance to a DNS server 252 (e.g., a DNS server accessible from within the virtual computing service network in which IVN 210 is implemented) requesting an IP address of Svc1. The DNS server 252 may provide a public IP address 205 exposed or advertised by Svc1, as indicated by the arrow labeled "2". In at least some embodiments, a DNS lookup may only have to be performed if the application has not interacted with Svc1 in some time. That is, once the address of Svc1 has been obtained, it may be used for a long period by the instance 112B (e.g., for as long as the address remains valid) without further interaction with the DNS server 252.

A service request directed to Svc1 may be included in the body of a baseline packet 250 generated at instance 112B in the depicted embodiment and sent to the networking stack of the compute instance for propagation towards Svc1. The baseline packet 250 may indicate the private IP address of instance 112B as its source address, and the public IP address of Svc1 as the destination. As with other network packets, the baseline packet may be intercepted by VMC 240 (which may be responsible for physical network transmissions), as indicated by the arrow labeled "3".

VMC 240 may have access to PAE-related metadata and other IVN metadata in the depicted embodiment, such as route table 235 and a list 236 of Svc1 public IP addresses. The route table 235 may include entries indicating the targets that should be used for routing packets intended for various destinations—e.g., for packets with destination addresses in the range N1.N2.N3.*, the target K.L.M.N should be used. A route table for packets intended for any node of Svc1 has been created in the example shown in FIG. 2, with a private alias endpoint PAE-1 indicated as the target. Based on an analysis of the destination indicated in baseline packet 250 and the PAE-related metadata available to it, VMC 240 may generate a first encapsulation packet 251 in the depicted embodiment. The body of packet 251 may incorporate the contents of baseline packet 250 (including its source and destination information), while additional headers 260 may be generated by VMC 240 in accordance with a first encapsulation protocol P1 that is used for communication between VMCs and tunneling intermediaries 242. Encapsulated packet 251 may be sent to a particular tunneling intermediary 242 from the VMC 240, as indicated by the arrow labeled "4". In at least some embodiments, the P1 headers 260 may include an indication that the baseline packet is associated with PAE1 and/or originated at IVN 210. It is noted that the path between the VMC 240 and the tunneling intermediary 242 may itself comprise several hops, e.g., with targets for the various hops being selected based on route table entries not shown in FIG. 2.

The tunneling intermediary 242 may examine the P1 headers 260 and/or the source/destination headers of the baseline packet 250 contained in encapsulated packet 251. Using a mapping database 262 of a second encapsulation protocol P2 (also referred to herein as a tunneling protocol), the tunneling intermediary 242 may generate a second encapsulation packet 255 comprising one or more P2 headers 261 and the baseline packet 250. The source and destination addresses of the baseline packet may be used as indexes into the mapping database 262 in some embodiments to identify the new source and packet headers to be used for packet 255. In some implementations, in accordance with protocol P2, an IPv4 baseline packet 250 may be encapsulated within an IPv6-compatible packet 255, e.g., using SIIT (Stateless IP/ICMP (Internet Protocol/Internet Control Message Protocol)) Translation) or a similar IPv4-IPv6 header translation mechanism. In other embodiments, a proprietary encapsulation protocol of the provider network may be used to generate encapsulation packet 255. In some embodiments, instead of using IPv6, additional IPv4 headers such as TCP option headers may be used by the tunneling intermediaries, or UDP (User Datagram Protocol) encapsulation may be used (e.g., by incorporating baseline packet contents within UDP messages). Examples of the kinds of information that may be included within P1 headers 260 and P2 headers 261 in some embodiments are provided in FIG. 4 and described below. The encapsulation packet 255 may be transmitted from the tunneling intermediary 242 to a device of the appropriate bridge network 160 that is to be traversed to reach Svc2 nodes.

Figure 3A:
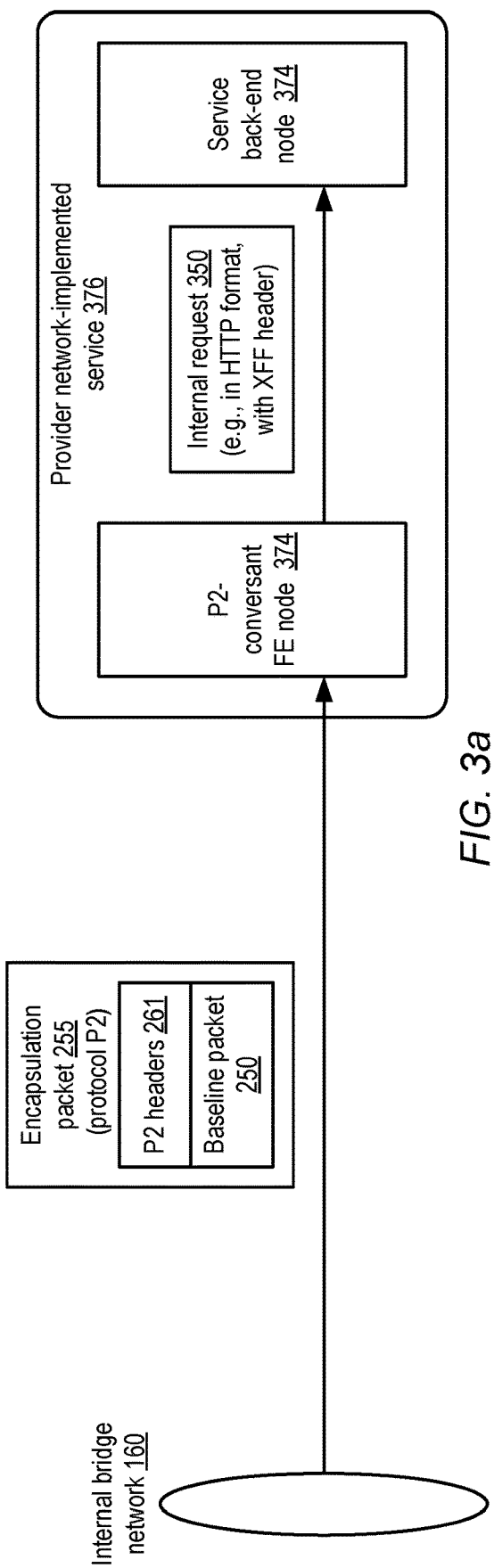
FIGS. 3a and 3b illustrate respective examples of alternative service-side components that may process packets originating at a compute instance of an isolated virtual network, according to at least some embodiments.
Figure 3B:
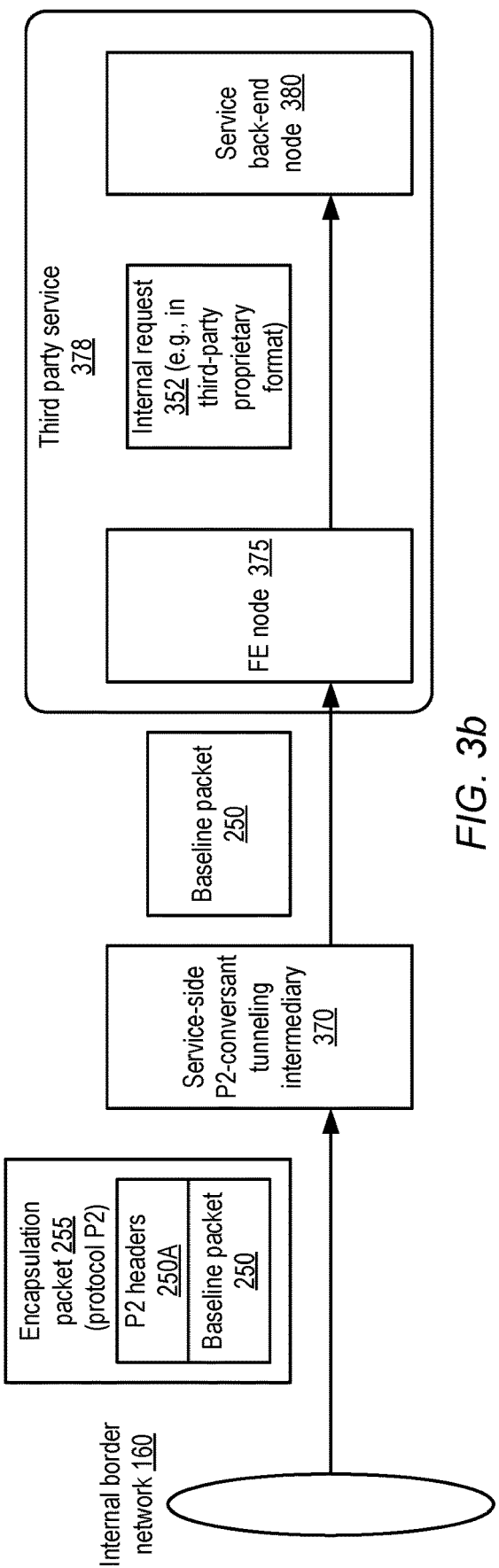

FIGS. 3a and 3b illustrate respective examples of service-side components that may process packets originating at a compute instance of an isolated virtual network, according to at least some embodiments. As mentioned earlier, in some embodiments at least two types of services may support client access from IVNs for which PAEs have been configured. The first type of service may be implemented by the provider network operator, while the second type may comprise services implemented by third parties such as customers of the provider network. For services of the first type, such as provider network-implemented service 376 shown in FIG. 3a, the front-end nodes 374 may be conversant with (i.e., capable of implementing) the encapsulation protocol P2 used by the tunneling intermediaries 242. That is, upon receiving a packet 255 formatted in accordance with protocol P2, a front-end node 374 of service 376 may be able to extract the baseline packet contents and generate a corresponding internal request 350 that can be sent to a back-end node 374 for processing. In some cases, the provider-network implemented service may support service requests formatted according to HTTP (Hypertext Transfer Protocol), for example, and the front-end node may add one or more X-Forwarded-For headers to the baseline request to indicate the identifiers of the source IVN at which the baseline packet was generated and/or the PAE used for routing the baseline packet. After the requested operations have been performed at the back-end nodes, a response may be transmitted back to the requesting compute instance, e.g., using similar encapsulation techniques in the response pathway. For example, the P2-conversant front-end nodes 374 of service 376 may generate a P2-compliant encapsulation packet comprising at least a portion of a baseline response and send it via bridge network 160 to a tunneling intermediary 242, which may in turn generate a P1-compliant encapsulation packet and transmit it to the appropriate VMC 240. The VMC 240 may extract the baseline response from the P1-compliant packet and provide it to the source compute instance such as 112B.

In contrast to the nodes of services implemented by the provider network operator, at least some third party services (such as third party service 378 shown in FIG. 3b) may not include nodes that are capable of extracting baseline packets from the encapsulation packets 255 generated in accordance with protocol P2. In some cases, for example, the details of P2 may not be available to the third party service operators, or such operators may not have the resources or expertise to build P2-compliant service nodes. Accordingly, in at least some implementations, in response to requests to register such third party services for PAE-based routing or in response to post-registration requests, a configuration or control-plane component of the provider network may establish one or more service-side P2-conversant intermediaries 370. Such a service-side intermediary 370 may extract the baseline packets 250 from the encapsulation packets 255, and transmit them to front-end nodes 375 of a third party service 378. The front-end node 375 may then translate the baseline packets 250 into internal requests 352, which may be generated in proprietary third party formats, HTTP, or in accordance with any other interface expected by the back-end nodes 380 of the service 378. Operations corresponding to the internal requests 352 may then be fulfilled at the back end nodes, and responses may be transmitted after encapsulation at the intermediaries 370 in the reverse direction to the compute instances at which the requests originated.

Encapsulation Formats

Figure 4:
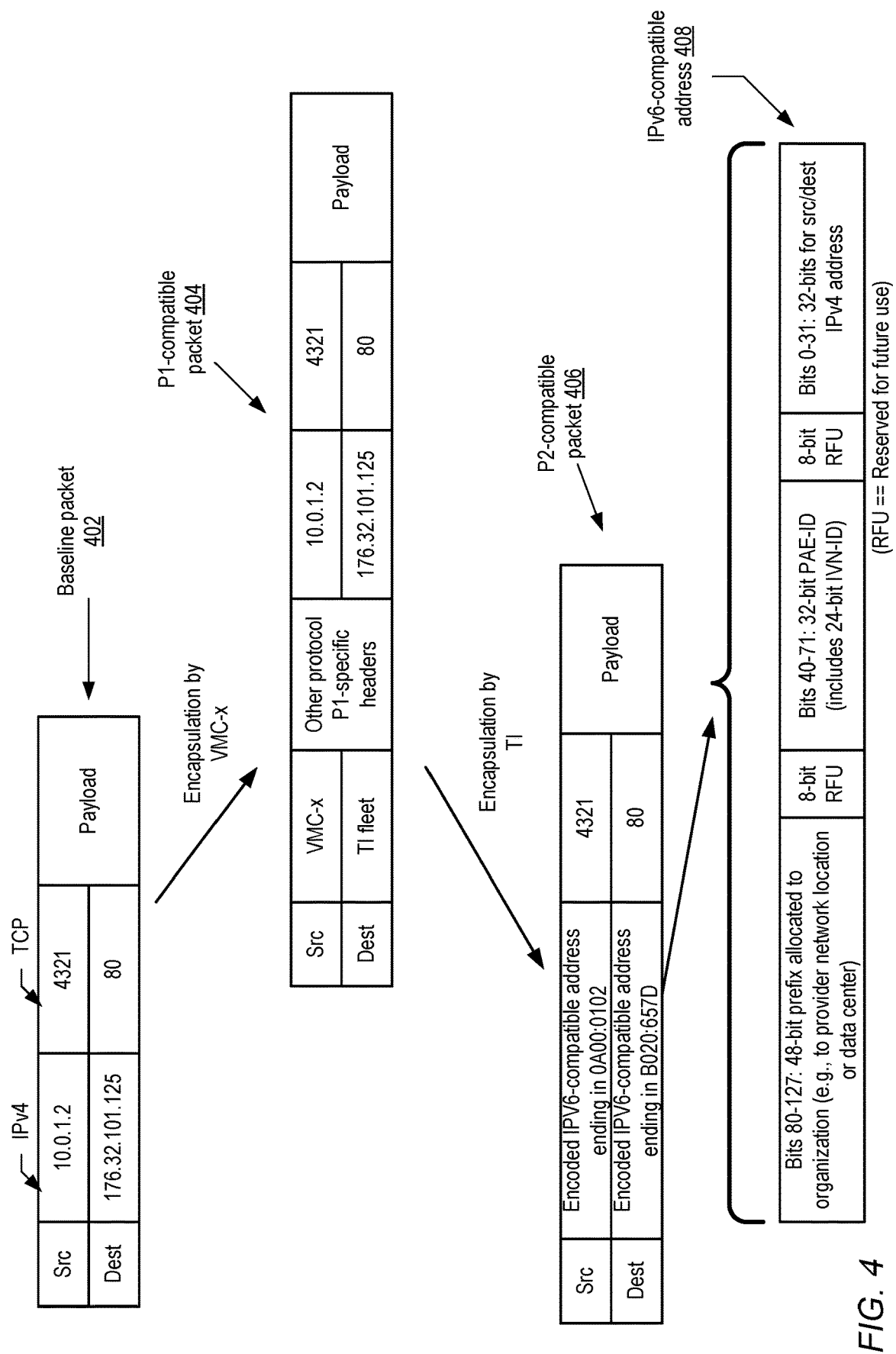
FIG. 4 illustrates examples of encapsulation formats for a baseline packet originating at a compute instance, according to at least some embodiments.

FIG. 4 illustrates examples of encapsulation formats for a baseline packet originating at a compute instance, according to at least some embodiments. As shown, the baseline packet 402 may indicate source and destination IP version 4 addresses in the depicted embodiment. For example, within an isolated virtual network, a private IP address "10.0.1.2" (not advertised outside the IVN) may have been assigned by a client to a compute instance 112, and this private IP address may be indicated as the source address in the baseline packet 402. A public IP version 4 address "176.32.101.25" may have been provided by a DNS server in response to a DNS query for an address of a particular publicly-accessible service Svc1 which is to be accessed from the compute instance. This public address of the service may be indicated as the destination of the baseline packet 402. TCP port numbers may also be indicated in the baseline packet, e.g., port 4321 as the source port at the compute instance and port 80 as the destination service port. A payload or body portion of the baseline packet 402 may indicate the type of service request being transmitted, such as a read or a write request directed to a storage service, as well as the parameters of the service request.

The baseline packet 402 may be encapsulated by a virtualization management component (e.g., VMC-x) at the instance's host in accordance with a first encapsulation protocol P1 used for communications with tunneling intermediaries in the depicted embodiment. In the P1-compatible packet 404, the baseline packet may be included in the body, and one or more P1 headers may be added. The identifier of the VMC may be indicated as the source, and the tunneling intermediary fleet may be indicated as the destination in some implementations. Other P1-specific headers, e.g., identifying the source IVN at which the baseline packet was generated and/or indicating the PAE that was indicated in the route table entry specifying Svc1 as the destination may be included in some embodiments in packet 404. The P1-compatible format may use IP version 4 formats for various header fields in at least some embodiments.

At a tunneling intermediary, P1-compatible packet 404 may be stripped of its P1 headers in the depicted embodiment, and a different set of headers may be added in accordance with tunneling protocol P2 to be used for communication across the bridge network to the destination service. In the depicted embodiment, P2-compatible packet 406, generated by the tunneling intermediary, may include IPv6 source and destination fields. A 32-bit subset of the 128 bits available for a source address in IPv6 may be used to indicate the private IPv4 address of the source compute instance in some embodiments. Similarly, a 32-bit subset of the 128 bits available for a destination address in IPv6 may be used to indicate the IPv4 public address of the destination service. For example, the low-order bits of packet 406's source address are 0A00:0102, which is an alternate representation of the source IPV4 address 10.0.1.2, and the low-order bits of packet 406's destination address are B020:657D, which is an alternate representation of the IPv4 destination address 176.32.101.25.

In one implementation, as indicated in the address structure 408 shown in FIG. 4, the 128 address bits available in IPv6 may be used as follows in accordance with tunneling protocol P2. The lowest-order 32 bits (bits 0 to 31) may be used for the source or destination IPv4 address, bits 40-71 may be used to indicate the PAE identifier, and bits 80-127 may be used for a 48-bit IPv6 prefix allocated to a provider network location or data center at which the source IVN or the destination service are being implemented. 24 bits (e.g., the higher-order 24 bits) of the 32 bits set aside for the PAE identifier may indicate the source IVN identifier in the depicted implementation. Thus, in at least some embodiments, the IVN identifier may be embedded within, and hence extractable from, the PAE identifier. Other encoding techniques for representing the source IVN identifier, the PAE identifier, or both may be used in different implementations. Some number of bits may be reserved for future use (RFU), such as bits 31-39 and bits 72-80, e.g., to accommodate possible future increases in the number of bits required to uniquely identify PAEs. One advantage of structuring the P2-compatible encapsulation packet addresses as shown (e.g., with the least-significant 32 bits used for encoding the IPv4 source/destination addresses) is that at least some load balancers may select the same destinations when they receive such an IPv6-compatible packet as would be selected if just the IPv4 portion of the 128 bits were indicated as the destination. Other approaches may be used to partition IPv6-compatible address structures in different embodiments, e.g., in which a different subset of the bits is used for indicating the IVN identifier and/or the PAE identifier.

According to at least some embodiments, the tunneling protocol may be implemented at the instance host at which the source compute instance runs, e.g., without the need for a separate tunneling intermediary fleet. In such embodiments, the two-step encapsulation illustrated in FIG. 4 may be combined into a single logical step implemented at the VMC and/or at a different service connectivity component running at the instance host. The VMC and/or the service connectivity component may be considered the tunneling intermediary between the source compute instance and the destination service in such embodiments.

PAE Configuration

Figure 5:
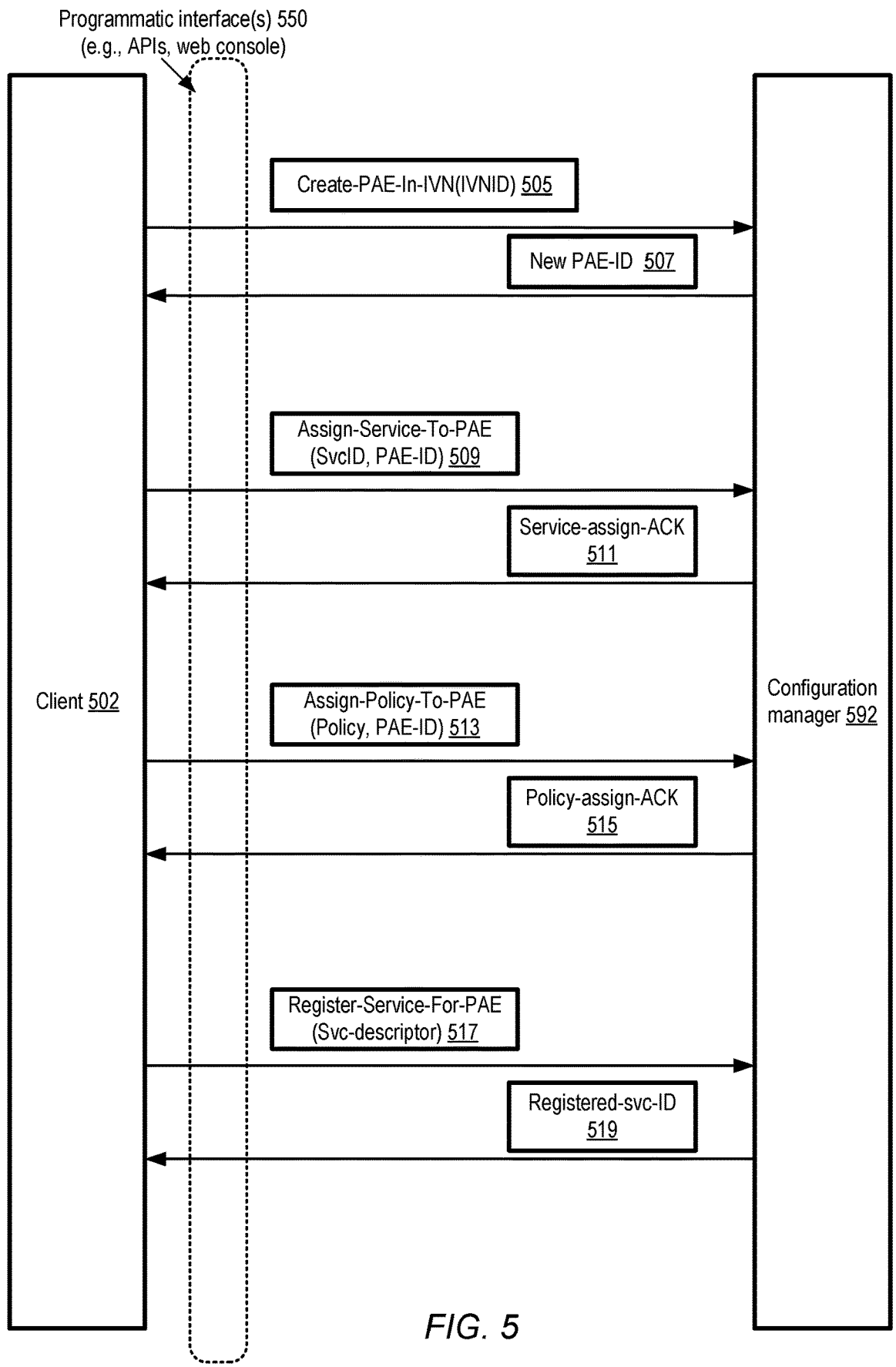
FIG. 5 illustrates examples of PAE configuration requests and responses, according to at least some embodiments.

FIG. 5 illustrates examples of PAE configuration requests and responses, according to at least some embodiments. As shown, a configuration manager 592 of the provider network may implement one or more programmatic interfaces 550, such as APIs, web-based consoles, custom GUIs or command-line tools. Using such an interface, a client 502 may submit a "Create-PAE-In-IVN" request 505 to create a private alias endpoint in a specified IVN, e.g., indicating the IVN identifier as a parameter in the request. In response, the configuration manager 592 may generate and store one or more entries for the requested PAE in its configuration database, and provide the identifier of the newly created PAE in response 507. In some embodiments, one or more PAEs may be set up automatically for an IVN at the time that the IVN is established for a client, and in such scenarios an explicit PAE creation request may not be required.

Client 502 may submit an "Assign-Service-to-PAE" request 509 to the configuration manager 592 after a PAE is created, indicating the particular service whose traffic is to be routed using the PAE. In some implementations, the PAE identifier and a service identifier may be supplied as parameters in such a request. In response, the configuration manager 592 may update its configuration metadata regarding the PAE and provided an acknowledgement 511 of the service assignment. In some embodiments the programmatic interfaces 550 may provide a list of registered service names (e.g., in a drop-down menu) from which one can be selected for association with a PA being configured.

Figure 6:
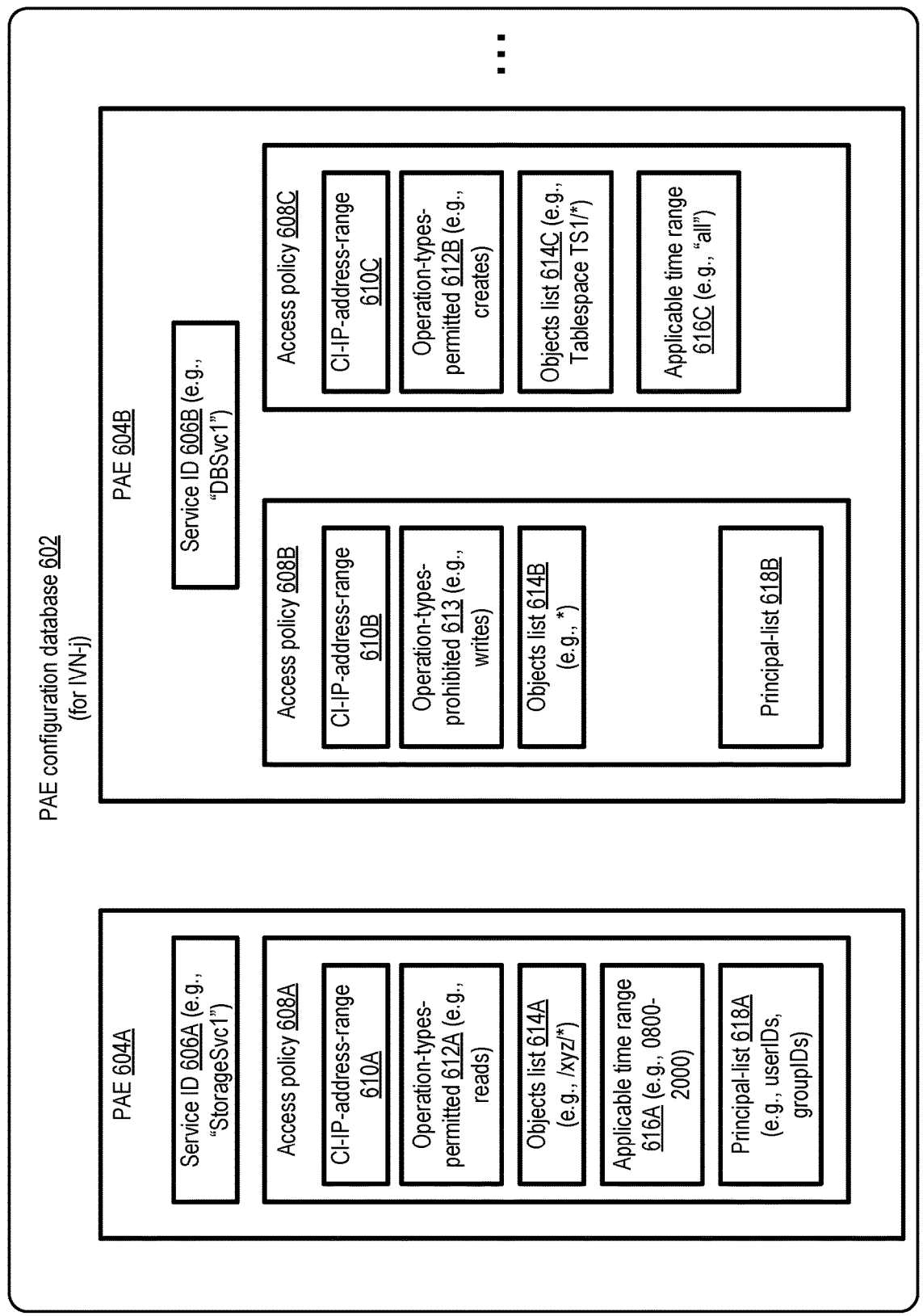
FIG. 6 illustrates examples of PAE configuration database contents, according to at least some embodiments.

Access control policies of various types may be assigned to a PAE in some embodiments, e.g., in response to an "Assign-Policy-to-PAE" request 513 specifying the policy and the PAE. Examples of applicable policies are shown in FIG. 6 and described below. The configuration manager 592 may store a representation of the indicated policy and the association of the policy with the PAE, and provide an acknowledgement 515 of the association to the client. In at least some embodiments, while the association of the policy may be requested for the PAE, the actual enforcement of the policy may be performed at one or more of (a) the service assigned to the PAE (n) a different service, such as an authorization and authentication service of the provider network, that can be invoked by the service assigned to the PAE to enforce the policy or (c) at the VMC of an instance host from which a service request is routed in accordance with the PAE. In some embodiments, an indication of the policy may be transmitted by the configuration manager to a control plane component of the service assigned to the PAE, e.g., before the acknowledgement 515 is provided to the client.

A client of the provider network may also submit a request 517 to register a service for PAE-assisted routing in some embodiments. For example, a third party service (i.e., a service not directly managed by the provider network operator) may be established using some set of resources of the provider network, and the operator of such a third party service may wish to enable access to the service from within IVNs without requiring public IP addresses to be used by at the IVNs. In such a scenario, a "Register-Service-For-PAE" request providing details of the service configuration (e.g., addresses of front-end nodes of the service) may be submitted by the client 502. In at least some implementations, a different configuration manager may be responsible for registering services than the configuration manager responsible for establishing PAEs, and a different set of programmatic interfaces may be used for service registration requests. In response to a service registration request, the configuration manager may perform one or more validation operations, e.g., to verify that the proposed to-be-registered service meets certain criteria for PAE compatibility before accepting the service and providing the client with the registered name or identifier of the registered service in response 519. In one implementation, for example, a front-end component of the service may be queried or tested to ensure that it can receive requests generated by tunneling intermediaries that use an encapsulation protocol of the provider network.

In some embodiments, additional configuration requests types may be supported beyond those illustrated in FIG. 5. For example, requests to configure service-side tunneling intermediaries (such as P2-conversant intermediary 370 of FIG. 3b) may be submitted by clients that have set up third party services in some embodiments. In one embodiment, clients may be able to re-assign PAEs to different services, or to assign more than one service to a PAE using additional types of configuration requests. In some implementations not all the types of configuration requests shown in FIG. 5 may be supported. As mentioned earlier, a client may establish multiple PAEs associated with a given IVN (e.g., for accessing different services from within the same IVN), and clients that have multiple IVNs may set up one or more PAEs at each such IVN.

FIG. 6 illustrates examples of PAE configuration database contents, according to at least some embodiments. A configuration database for a particular IVN (IVN-j) for which two PAEs have been established with the help of a configuration manager 592 is shown. PAE 604A is assigned service "StorageSvc1" (a storage service implemented at the provider network), as indicated in service identifier field 606A, while PAE 604A is assigned service "DBSvc1" (a database service implemented at the provider network) as indicated in service identifier field 606B. PAE 604A has access policy 608A assigned to it, while PAE 604B has two access policies 608B and 608C.

Access policy 608A applies to StorageSvc1 traffic directed from or to compute instances with IP addresses in the range CI-IP-address-range 610A in the depicted example. In some embodiments, instead of using IP addresses to indicate the traffic to which the policy is to apply, instance names or other identification data of compute instances may be used. A list of operation types for which requests are permitted from the address range 610A (e.g., reads versus writes) may be indicated in operation-types-permitted field 612A of policy 608A, and the objects of the service StorageSvc1 (e.g., objects stored in a directory "/xyz") to which those operations can be directed are indicated in objects list 614A. In the depicted example, time ranges for which the policy 608A is to be applied (e.g., specific hours of each work day, or specific days of the week) may be indicated in applicable time range field 616A. A list of principals (e.g., identifiers of users or groups) 618A may also be associated for policy 608A, indicating the entities whose service requests are to be governed by the rules indicated in policy 608A.

Each of access policies 608B and 608C to be enforced for PAE 604B may indicate their respective CI-IP-address ranges 610, indicating the compute instances to which the rules of the policy are to be applied. In some policies such as 608B, the types of operations that are prohibited may be indicated (e.g., in operation-types-prohibited field 613), e.g., instead of or in addition to the types of operations that are permitted. As indicated by the "*" in the objects list 614B, the operations indicated in field 613 may be prohibited for all the objects of DBSvc1 in the depicted example for the principals indicated in principals-list 618B. As shown, not all the types of entries that can be included in a policy need be specified for every policy—for example, policy 608B does not include an applicable time range, while policy 608C does not include a principal list. Default values may be used for the types of entries that are not included in a policy—e.g., the whole day may be assumed to be the applicable time range, and the policy rules may be applied to all principals if no specific principals are listed. In the depicted example, field 612B may indicate the operation types permitted on objects listed in field 614C during applicable time ranges 616C.

In some embodiments, if no specific access policies are specified by a client for a given PAE, the provider network may apply some set of defaults to determine the rules to be applied to service requests submitted to the corresponding service. The defaults may differ from service to service in some implementations. As mentioned earlier, in some embodiments the services to which the PAEs have been assigned may be responsible for enforcing the policies (either at the service's own nodes, or by submitting a request to another service of the provider network, such as an identity and authorization management service). The service requests for some services may be encrypted in such a way that it is only possible to determine the type of operation that is being requested after the request reaches the service, and as a result access policies may have to be applied at the service end. In such cases, the policies may be communicated to the services (e.g., to control-plane or administrative components of the services) by the configuration managers to which the policies are indicated by the clients (e.g., IVN configuration managers). In other embodiments, at least some of the rules of a policy may be enforced at the requester end (e.g., the IVN end)—for example, it may be possible for a VMC to reject a write request issued from a compute instance if the corresponding user is listed in the principals list of an applicable policy and all writes are prohibited for the listed principals.

Distinguishing Among Requests from Re-Used Private IP Addresses

Clients may use the flexibility granted on IVN network configuration to assign private IP addresses of their choice to IVN compute instances in some embodiments as described above, e.g., without considering whether the same addresses are in use elsewhere (e.g., in other IVNs or in the public Internet). In some cases a client may assign the same IP address to instances in different IVNs. For a number of reasons (such as for accurate recording of the sources from which requests are received at a service), it may be useful for a service to be able to distinguish between requests from different IVNs, even if the same source IP addresses may be indicated in the requests.

Figure 7:
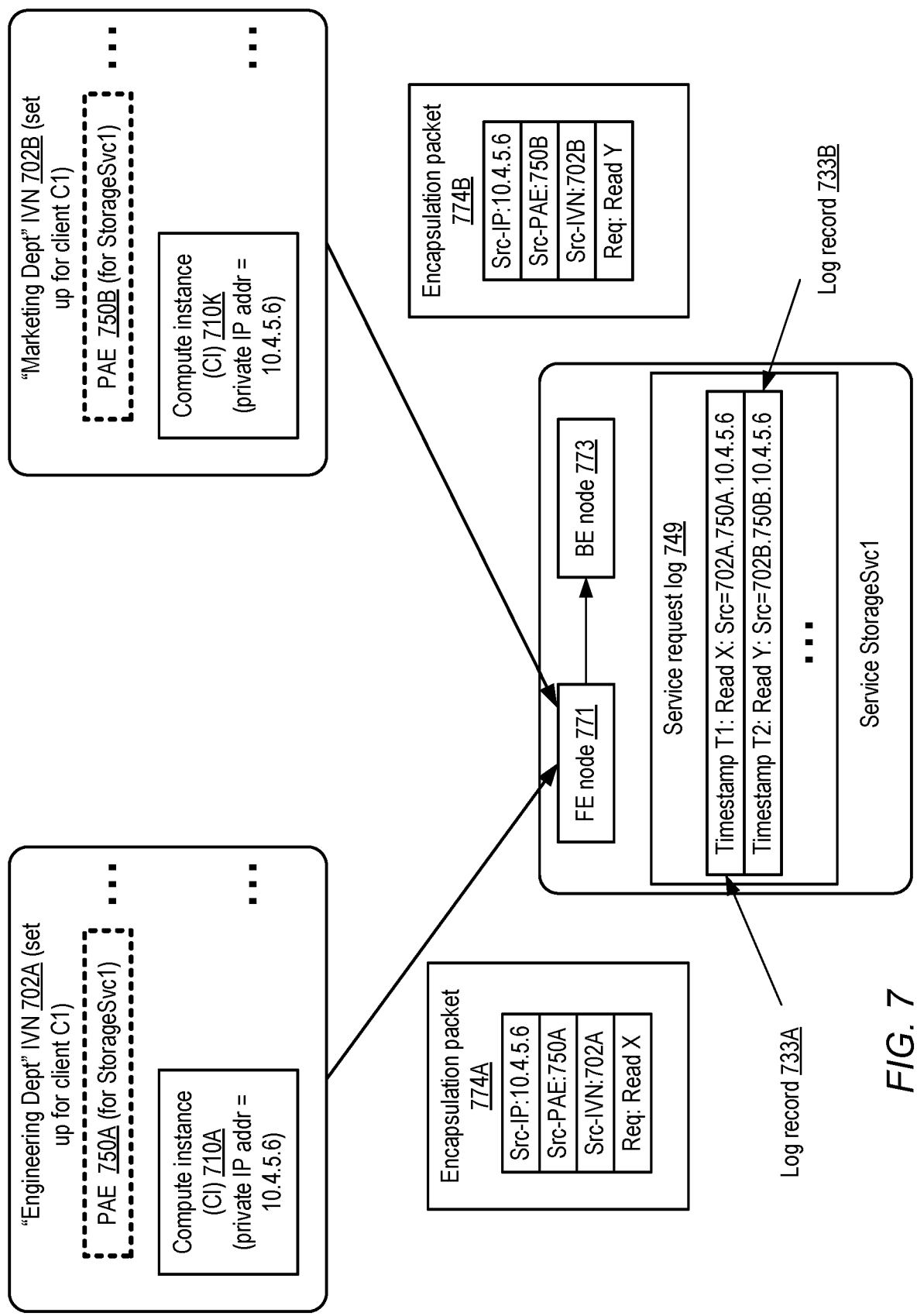
FIG. 7 illustrates an example of a use of IVN and PAE identifiers to distinguish between requests received at a service from compute instances with the same private IP addresses, according to at least some embodiments.

FIG. 7 illustrates an example of a use of IVN and PAE identifiers to distinguish between requests received at a service from compute instances with the same private IP addresses, according to at least some embodiments. As shown, respective IVNs 702A and 702B may be set up by a client C1, with IVN 702A set up for use by an Engineering Department of the client's organization, and IVN 702B set up for use by a Marketing Department of the organization. Both organizations may need to access objects stored at the same publicly-accessible storage service "StorageSvc1" in the depicted example. PAE 750A may be established for accessing StorageSvc1 from IVN 702A, and PAE 750B may be established for accessing StorageSvc1 from IVN 702B.

Client C1 may (e.g., deliberately or by accident) assign the same private IP address 10.4.5.6 to a compute instance 710A in IVN 702A, and to compute instance 710K in IVN 702B. Service requests directed to StorageSvc1 may be generated at both compute instances 710A and 710K. In accordance with an encapsulation protocol that may be implemented at tunneling intermediaries of the provider network as described above, an encapsulation service request packet 774A indicating a request from IVN 702A to read an object X of StorageSvc1 may be transmitted to a front-end node 771. The encapsulation packet 774A may indicate the private IP address 10.4.5.6 as the original source of the request, and may also include encodings of the IVN identifier 702A and the PAE 750A used for routing the request. Similarly, an encapsulation packet 774B indicating a request to read an object Y of the service may be received at front-end node 771. Packet 774B may also indicate its source instance's private IP address (10.4.5.6, identical to that indicated in packet 774A), the source IVN (702B), and the PAE 750B used for routing its request in the depicted embodiment.

The front-end node 771 (and/or the back-end node 773 at which the requested work is performed) may be able to use the IVN and/or PAE identification information included in the received packets to distinguish the source of the requests, even though the source IP addresses indicated in the packets 774A and 774B are identical. Thus, a log record 733A may be generated (by either the FE node or the BE node) indicating the timestamp T1 at which the request to read X was received or processed, the private IP address 10.4.5.6 of the requesting compute instance, the identifiers of IVN 702A and PAE 750A. A similar log record 733B may be generated for the request to read Y, indicating the timestamp T2 of receiving or processing, the source IP address 10.4.5.6, and the identifiers of IVN 702B and PAE 750B. In some embodiments, only the identifier of the IVN or the identifier PAE may be included in the log records (or in the encapsulation packets), since either one may be sufficient for disambiguating the source of the request.

It is noted in embodiments in which the tunneling intermediaries incorporate IVN or PAE identifiers within the source headers of encapsulation packets 774 as described above, traffic from different IVNs may be disambiguated even in scenarios where the service-side nodes (such as front-end nodes 771 and/or back-end nodes 773) may not necessarily be capable of parsing the contents of the source headers. For example, if a third party service is registered to use PAE-based routing, and IPv6 is being used for encapsulation, the nodes of the third party service may not be aware of which specific bits of an IPv6 header are used for encoding the source IVN information or the source PAE information. However, since the IPv6 source header for a packet P1 from IVN 702A would differ from the IPv6 source header for a packet P2 from IVN 702B, the third party service nodes would at least be able to determine that P1 and P2 are from different sources, even if details regarding IVN identifiers and/or PAE identifiers are not ascertained at the third party service nodes. Of course, if the third party service node is responsible for implementing access control policies similar to those illustrated in FIG. 6, and the access control policies are associated with specific IVNs or specific PAEs, the third party service node may have to obtain the IVN/PAE identifiers.

Methods for Private Alias Endpoints

FIG. 8 is a flow diagram illustrating aspects of operations that may be performed to configure PAEs, according to at least some embodiments. As shown in element 801, one or more isolated virtual networks may be set up on behalf of a client C1 at a provider network, e.g., using resources of a virtual computing service. Each IVN may include some set of resources such as compute instances and the like for which internal networking configuration choices (such as subnet setup, IP address assignment, and so on) can be made by the client. For example, the client may assign private IP addresses (addresses that are not advertised outside the IVN) to compute instances' virtual network interfaces without having to ensure that a given private IP address is unique with respect to resources outside the IVN. If the client wishes to use the same private IP address "a.b.c.d" at two different IVNs IVN1 and IVN2, that address may be assigned to a compute instance CI1 in IVN1 and a different compute instance CI1 in IVN2, for example. It is noted that uniqueness for IP addresses may still be required within a given IVN in at least some embodiments—e.g., the same IP address may not be assignable to two instances that are launched within the same IVN.

In the depicted embodiment, the virtual computing service may enable clients to submit service requests from IVN compute instances with private IP addresses to publicly-accessible services (e.g., storage or database services implemented by the provider network operator, and/or third party services implemented by other customers of the provider network) using private endpoint aliases (PAEs) associated with the IVNs. As shown in element 804, a metadata record representing a particular PAE (PAE1) established for IVN1 on behalf of C1 may be created and stored, e.g., by a configuration manager component of the virtual computing service or the provider network. In at least some implementations, at the time that PAE1 is created (e.g., in response to a programmatic request from C1), PAE1 need not be associated with or tied to any particular service. Within a route table associated with IVN1, PAE1 may eventually be indicated as a route target for network traffic originating within IVN1 and directed towards a selected service implemented elsewhere in the provider network (i.e., outside IVN1), e.g., after a separate configuration step in which the selected service is assigned to PAE1, as indicated in element 807.

In at least some embodiments, a number of services may have been registered for PAE support, e.g., after the provider network operator has set up and tested/verified the components (such as tunneling intermediaries) that may be required for implementing the encapsulation protocols used to transmit packets between instances with private IP addresses at the IVN end, and service nodes with public IP addresses at the service end. The public IP addresses of the services may also have to be verified (and updated as needed) in some embodiments within a configuration database accessible to the tunneling intermediaries and/or virtualization management components at the instance hosts of the IVN. In at least one embodiment, programmatic interfaces available to the client C1 may enable the client to select services from among such a registered set when assigning a service Svc1 to PAE1 (element 807)—that is, clients may only be allowed to associate pre-approved services to a PAE set up for their IVN. In one implementation, the association between a PAE such as PAE1 and a service such as Svc1 may be represented within the IVN configuration database by setting a value of a "service" attribute of the PAE.

One or more access policies may be associated with a given PAE such as PAE1 in some embodiments (element 810). The access policies may, for example, indicate the types of operations or service requests that are permitted or prohibited using PAE1, the object types to which access is granted via PAE1, the principals (e.g., users or groups) to whom the policy rules apply, the time periods for which the policy rules apply, and so on. In some embodiments, the client C1 may indicate access policies of their choice for PAE1, e.g., using a programmatic interface. A default access policy may be applied in some implementations to a PAE if the client does not indicate one. Policies may also be represented as attributes of PAEs in some implementations. In some embodiments in which multiple policies can be assigned to a given PAE, the configuration manager may be responsible for detecting conflicts between different policies. For example, one policy may allow a particular type of operation on a particular object, while another policy may prohibit that type of operation. In some implementations, the configuration manager may request the client to prioritize among conflicting policies or to remove the conflicts. In other embodiments, the configuration manager may simply apply specified policies in some default priority order (e.g., with more recently-applied policies overriding older policies by default) and conflicts may be resolved accordingly.

A route table entry indicating PAE1 as a target for traffic whose destination is Svc1 may be created and attached (e.g., by C1 via a request submitted using a programmatic interface) to one or more subnets of IVN1 in the depicted embodiment (element 813). Instead of specifying particular IP address ranges as the sources and destinations for the route table entry, the registered name of the service may be indicated as the destination, and the name or identifier assigned to PAE1 when PAE1 was created may be indicated as the target, thus considerably simplifying route management between IVN1 and Svc1 from the perspective of the client C1. After the route table entry has been attached, traffic flow between the instances of the subnet and Svc1 may begin.

In at least some embodiments, it may be the case that the set of public IP addresses associated with the service (e.g., Svc1) assigned to one or more PAEs (e.g., PAE1) may change over time. The control plane or administrative components of registered services such as Svc1, and/or the configuration manager of the virtual computing service, may be responsible for propagating updates to the list of public IP addresses and/or other PAE-related configuration information to the components where such addresses may be used in the depicted embodiment (element 816). Such updates may be made, for example, to configuration databases accessible from tunneling intermediaries at which encapsulation protocols of the kind described above are to be implemented, and/or databases accessible from virtualization management components of the IVN instance hosts.

Figure 9:
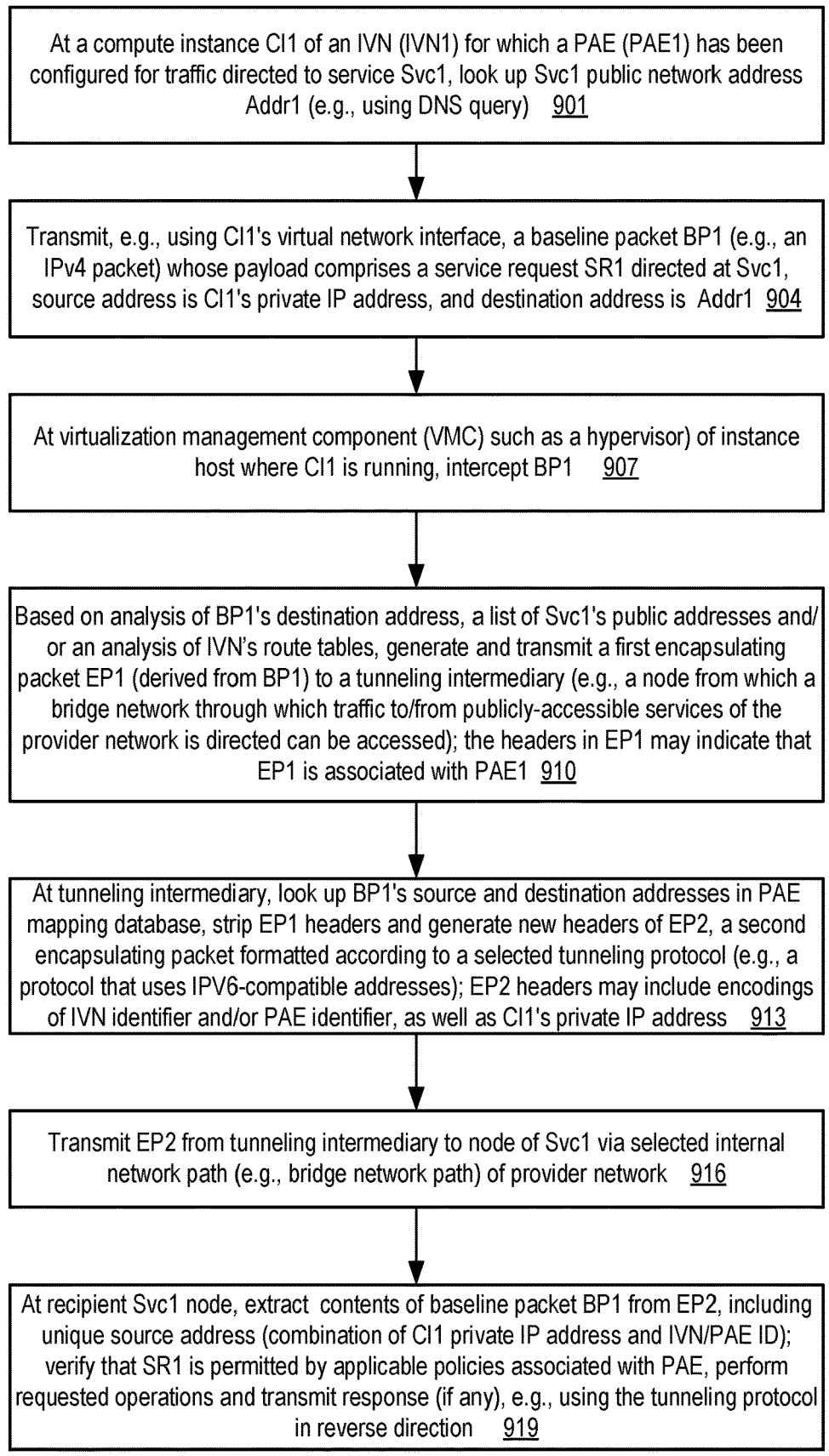
FIG. 9 is a flow diagram illustrating the use of a tunneling protocol for transmitting packets from a compute instance to a publicly-accessible service, according to at least some embodiments.

FIG. 9 is a flow diagram illustrating the use of a tunneling protocol for transmitting packets from a compute instance to a publicly-accessible service, according to at least some embodiments. As shown in element 901, a public IP address "Addr1" for a service Svc1 to be accessed may be determined (e.g., using a DNS query) at a compute instance CI1 implemented at an IVN (IVN1) for which a PAE (PAE1) has been established for traffic to/from Svc1. At the compute instance CI1, a baseline packet BP1 whose body indicates at least a portion of a service request SR1 may be generated (element 904). CI1's private IP address may be indicated as the source address of BP1, and Addr1 may be indicated as the destination. BP1 may be transmitted from CI1 towards Addr1, e.g., using a virtual network interface attached to CI1.

In the depicted embodiment, the baseline packet BP1 may be intercepted by a virtualization management component (VMC), such as a hypervisor or a privileged domain operating system, at the instance host where CI1 runs (element 907). The VMC may, for example, serve as an intermediary between virtualized resources (such as the virtual network interface) and hardware components (such as a physical network interface card) of the instance host. The VMC may analyze BP1's destination address and/or one or more elements of PAE configuration information, such as a route table entry indicating that traffic from CI1 to Svc1 should be targeted to PAE1. In at least one embodiment, the VMC may also or instead be able to look up Addr1 in a list of public IP addresses of Svc1. Based on the examination of the configuration information, the VMC may be able to determine that a first encapsulation packet EP1, derived from BP1, is to be sent towards a tunneling intermediary, e.g., for further transmission towards Addr1 via a bridge network (element 910). The tunneling intermediary may, for example, be one node of a multi-node fleet that has been set up for routing traffic between nodes of the virtual computing service (such as CI1) and nodes of publicly-accessible services (such as Svc1) via an internal bridge network. The first encapsulation packet EP1 may be formatted in accordance with a first encapsulation protocol P1 that is used for routing within various components of the virtual computing service in some embodiments. Within EP1, BP1 (including BP1's source and destination headers) may be incorporated within a body component, and one or more P1 headers may be added by the VMC in some implementations. The added headers of EP1 may indicate, for example, the VMC (or the instance host at which the VMC runs) as the source and the tunneling fleet (or a specific tunneling intermediary) as the destination. In one implementation, an identifier of IVN1 and/or PAE1 may also be included in an EP1 header. In some embodiments, an EP1 header may not necessarily indicate PAE1's identifier, but may include a field that indicates that EP1 is a packet associated with a PAE.

EP1 may eventually reach a tunneling intermediary in the depicted embodiment, e.g., after traversing one or more hops of the virtual computing service's network. At the tunneling intermediary, BP1 may be extracted and the contents of the EP1 headers may be examined. BP1's source and destination addresses (i.e., CI1's private IP address and the Svc1 address Addr1) may be used to look up corresponding source and destination addresses in a mapping database of a tunneling protocol P2, which are to be specified in a second encapsulation packet EP2 (element 913). In some embodiments, the baseline packet Bp1 (and/or EP1) may be formatted in accordance with IPv4, while the source and destination addresses to be used in the tunneling protocol may be formatted in accordance with IPv6, e.g., using SIIT or a similar IPv4-IPv6 translation protocol. In other embodiments, the tunneling protocol may be proprietary, e.g., IPv6-style addresses need not necessarily be used. In some embodiments in which IPv6 addresses are not used for the tunneling protocol, encapsulation of baseline packets may be performed using additional IPv4 headers such as TCP option headers. In at least one embodiment, UDP (User Datagram Protocol) encapsulation may be used (e.g., by incorporating a baseline packet within a UDP message). The EP1 headers may be removed and replaced by EP2 headers at the tunneling intermediary in the depicted embodiment. As illustrated in FIG. 4, in some embodiments one or more EP2 headers may respectively indicate or encode (a) BP1 source and destination addresses (e.g., using 32 bits of a 128-bit EP2 source address header to encode a 32-bit BP1 source IP address, and using 32 buts of a 128-bit EP2 destination address field to encode a 32-bit Bp1 destination IP address) and/or (b) identifiers of the source IVN (IVN1) and the PAE used for the routing (PAE1). In some implementations, a PAE identifier that may be included in an IP2 header may itself comprise an encoding of the corresponding IVN's identifier, and so the PAE identifier may be usable at the service to determine both the IVN and the PAE from which a request has been received. In at least one implementation, the BP1 destination address may be included within the EP2 source and destination headers respectively in such a way (e.g., in the lowest 32 bits) that load balancers route a given packet to the same service front-end node regardless of whether the BP1 destination address is used or the EP2 destination address is used.

EP2 may be transmitted from the tunneling intermediary to a front-end node of Svc1 (element 916), e.g., via a selected path of a bridge network established within the provider network. In some embodiments, EP2 may reach Svc1 using only private network links managed and/or owned by the provider network operator. In other embodiments, the path used for EP2 may include public network links (e.g., the packet may pass through network devices outside the provider network, or managed/owned by entities other than the provider network operator) At the front-end node of Svc1, BP1 contents indicating the service request SR1 may be extracted (element 919). In addition, a unique identification of the source instance CI1 may be possible at the service using the EP2 headers, e.g., even if the same IP address is assigned to CI1 as is assigned to other instances of other IVNs. For example, the identifier of the source IVN and/or the PAE used for routing the contents of BP1, which may be extracted from an EP2 header or headers, may be used to disambiguate service requests from such instances in embodiments in which each IVN may include only a single instance with a particular private IP address. In at least some embodiments, the service request SR1 may be validated at the service side in accordance with one or access control policies associated with the PAE. After access permissions are checked, the requested operations may be performed, e.g., at back-end nodes of the service Svc1. In at least some embodiments, a response may be generated to at least some types of requests, and the response may be transmitted in the reverse direction towards CI1 using the same protocols in reverse order. For example, a baseline response whose content is generated at a back-end service node may be formatted according to the tunneling protocol P2 at a front-end node of the service and transmitted across the bridge network to a tunneling intermediary of the virtual computing service. At the tunneling intermediary, the response may be extracted, formatted in accordance with the first encapsulation protocol P1, and passed on to the VMC at the instance host where CI1 runs. The VMC may extract the baseline response and provide it to CI1.

It is noted that in various embodiments, operations other than those illustrated in the flow diagram of FIGS. 8 and 9 may be used to implement at least some of the techniques for supporting private alias endpoints. Some of the operations shown may not be implemented in some embodiments, may be implemented in a different order or at a different component than illustrated in FIG. 8 or 9, or in parallel rather than sequentially. In at least one embodiment, the functionality described for the tunneling intermediary and the VMC may be combined, for example—e.g., a tunneling protocol that allows packets to be transmitted to the service via a selected pathway without further encapsulation by a separate intermediary may be implemented at a VMC. In another embodiment, baseline packets may be transmitted from a compute instance or from a non-virtualized computing device to a tunneling intermediary without being encapsulated by a VMC.

Use Cases

The techniques described above, of establishing private alias endpoints to serve as routing targets for traffic directed from compute instances of isolated virtual networks to publicly-accessible services, may be useful in a variety of scenarios. As more and more distributed applications are migrated to provider network environments, and the sophistication of network-based attackers increases, the need for securing and isolating client applications from network intrusions originating in the public Internet is also increasing. Although isolated virtual networks enable clients to assign private IP addresses to compute instances that are not advertised to or accessible from the public Internet, accessing services that expect requests to originate at public IP addresses from such instances may present problems. Private alias endpoints may enable such service requests to be transmitted without requiring potential security compromises and without inefficient/expensive routing of the requests via VPN connections.

Illustrative Computer System

Figure 10:
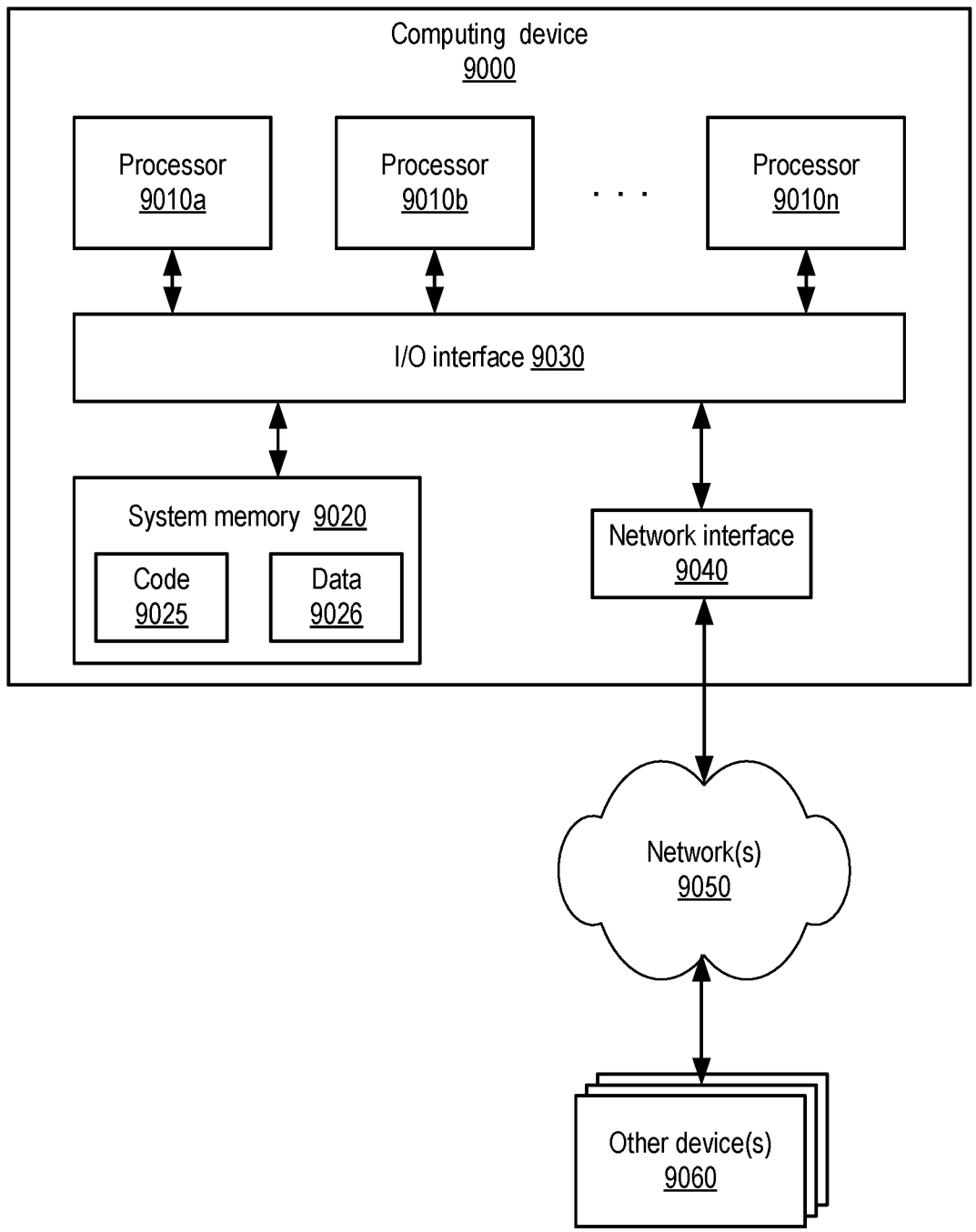
FIG. 10 is a block diagram illustrating an example computing device that may be used in at least some embodiments.

In at least some embodiments, a server that implements one or more of the components that are used to support private alias endpoints, such as configuration managers, VMCs, tunneling intermediaries, and nodes of publicly-accessible services, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
    establishing a private endpoint to route traffic, originating from an isolated virtual network established within a provider network, from the isolated virtual network to a publicly-accessible service implemented in the provider network, wherein the isolated virtual network comprises a plurality of compute nodes;
    generating one or more routing table entries indicating that packets directed from the isolated virtual network to the publicly-accessible service are to be directed from the isolated virtual network to the private endpoint; and
    transferring, in accordance with the one or more routing table entries, at least a portion of contents of a packet originating at the isolated virtual network to the publicly-accessible service without utilizing the public Internet.

2. The computer-implemented method as recited in claim 1, further comprising:
    preparing, at a virtualization management component, an encapsulation packet whose payload comprises at least the portion of the contents of the packet originating at the isolated virtual network; and
    transmitting, from the virtualization management component, the encapsulation packet to a first intermediary device configured to process traffic of the isolated virtual network.

3. The computer-implemented method as recited in claim 1, further comprising:
    generating, at an intermediary device configured to process traffic of the isolated virtual network, a second encapsulation packet from a first encapsulation packet whose payload comprises at least the portion of the contents of the packet originating at the isolated virtual network, wherein the first encapsulation packet is formatted in accordance with a first encapsulation protocol, and wherein the second encapsulation packet is formatted in accordance with a second encapsulation protocol; and
    transmitting the second encapsulation packet from the first intermediary device to a device configured to extract at least the portion of the contents of the packet from the second encapsulation packet.

4. The computer-implemented method as recited in claim 1, further comprising:
    obtaining one or more programmatic requests to establish the private endpoint, wherein said establishing the private endpoint is in response to the one or more programmatic requests.

5. The computer-implemented method as recited in claim 1, further comprising:
    assigning the private endpoint to the publicly-accessible service in response to one or more programmatic requests.

6. The computer-implemented method as recited in claim 1, further comprising:
    applying, in response to one or more programmatic requests, a control policy to the private endpoint, wherein the control policy indicates, with respect to requests routed using the private endpoint, one or more of: (a) a permitted operation type, (b) a prohibited operation type, (c) a time interval during which a particular operation type is permitted, or (d) a particular object on which a particular operation type is permitted.

7. The computer-implemented method as recited in claim 1, further comprising:
    obtaining one or more programmatic requests to register a different service for access using another private endpoint; and
    implementing, prior to registering the different service, one or more operations to verify that the different service satisfies a criterion for access via the other private endpoint.

8. A system, comprising:
    one or more computing devices;
    wherein the one or more computing devices include instructions that upon execution on or across the one or more computing devices cause the one or more computing devices to:
        establish a private endpoint to route traffic, originating from an isolated virtual network established within a provider network, from the isolated virtual network to a publicly-accessible service implemented in the provider network, wherein the isolated virtual network comprises a plurality of compute nodes;
        generate one or more routing table entries indicating that packets directed from the isolated virtual network to the publicly-accessible service are to be directed from the isolated virtual network to the private endpoint; and transfer, in accordance with the one or more routing table entries, at least a portion of contents of a packet originating at the isolated virtual network to the publicly-accessible service without utilizing the public Internet.

9. The system as recited in claim 8, wherein the one or more computing devices include further instructions that upon execution on or across the one or more computing devices further cause the one or more computing devices to:

prepare, at a virtualization management component, an encapsulation packet whose payload comprises at least the portion of the contents of the packet originating at the isolated virtual network; and transmit, from the virtualization management component, the encapsulation packet to a first intermediary device configured to process traffic of the isolated virtual network.

10. The system as recited in claim 8, wherein the one or more computing devices include further instructions that upon execution on or across the one or more computing devices further cause the one or more computing devices to:

generate, at an intermediary device configured to process traffic of the isolated virtual network, a second encapsulation packet from a first encapsulation packet whose payload comprises at least the portion of the contents of the packet originating at the isolated virtual network, wherein the first encapsulation packet is formatted in accordance with a first encapsulation protocol, and wherein the second encapsulation packet is formatted in accordance with a second encapsulation protocol; and transmit the second encapsulation packet from the first intermediary device to a device configured to extract at least the portion of the contents of the packet from the second encapsulation packet.

11. The system as recited in claim 8, wherein the one or more computing devices include further instructions that upon execution on or across the one or more computing devices further cause the one or more computing devices to:

obtain one or more programmatic requests to establish the private endpoint, wherein the private endpoint is established in response to the one or more programmatic requests.

12. The system as recited in claim 8, wherein the one or more computing devices include further instructions that upon execution on or across the one or more computing devices further cause the one or more computing devices to:

assign the private endpoint to the publicly-accessible service in response to one or more programmatic requests.

13. The system as recited in claim 8, wherein the one or more computing devices include further instructions that upon execution on or across the one or more computing devices further cause the one or more computing devices to:

apply, in response to one or more programmatic requests, a control policy to the private endpoint, wherein the control policy indicates, with respect to requests routed using the private endpoint, one or more of: (a) a permitted operation type, (b) a prohibited operation type, (c) a time interval during which a particular operation type is permitted, or (d) a particular object on which a particular operation type is permitted.

14. The system as recited in claim 8, wherein the one or more computing devices include further instructions that upon execution on or across the one or more computing devices further cause the one or more computing devices to:

transfer the portion of contents of a packet originating at the isolated virtual network to the publicly-accessible service using a tunneling protocol.

15. One or more non-transitory computer-accessible storage media storing program instructions that when executed on or across one or more processors cause the one or more processors to:

establish a private endpoint to route traffic, originating from an isolated virtual network established within a provider network, from the isolated virtual network to a publicly-accessible service implemented in the provider network, wherein the isolated virtual network comprises a plurality of compute nodes;

generate one or more routing table entries indicating that packets directed from the isolated virtual network to the publicly-accessible service are to be directed from the isolated virtual network to the private endpoint; and transfer, in accordance with the one or more routing table entries, at least a portion of contents of a packet originating at the isolated virtual network to the publicly-accessible service without utilizing the public Internet.

16. The one or more non-transitory computer-accessible storage media as recited in claim 15, storing further program instructions that when executed on or across one or more processors further cause the one or more processors to:

prepare, at a virtualization management component, an encapsulation packet whose payload comprises at least the portion of the contents of the packet originating at the isolated virtual network; and transmit, from the virtualization management component, the encapsulation packet to a first intermediary device configured to process traffic of the isolated virtual network.

17. The one or more non-transitory computer-accessible storage media as recited in claim 15, storing further program instructions that when executed on or across one or more processors further cause the one or more processors to:

generate, at an intermediary device configured to process traffic of the isolated virtual network, a second encapsulation packet from a first encapsulation packet whose payload comprises at least the portion of the contents of the packet originating at the isolated virtual network, wherein the first encapsulation packet is formatted in accordance with a first encapsulation protocol, and wherein the second encapsulation packet is formatted in accordance with a second encapsulation protocol; and transmit the second encapsulation packet from the first intermediary device to a device configured to extract at least the portion of the contents of the packet from the second encapsulation packet.

18. The one or more non-transitory computer-accessible storage media as recited in claim 15, storing further program instructions that when executed on or across one or more processors further cause the one or more processors to:

obtain one or more programmatic requests to establish the private endpoint, wherein the private endpoint is established in response to the one or more programmatic requests.

19. The one or more non-transitory computer-accessible storage media as recited in claim 15, storing further program instructions that when executed on or across one or more processors further cause the one or more processors to:

assign the private endpoint to the publicly-accessible service in response to one or more programmatic requests.

20. The one or more non-transitory computer-accessible storage media as recited in claim 15, storing further program instructions that when executed on or across one or more processors further cause the one or more processors to:

apply, in response to one or more programmatic requests, a control policy to the private endpoint, wherein the control policy indicates, with respect to requests routed using the private endpoint, one or more of: (a) a permitted operation type, (b) a prohibited operation type, (c) a time interval during which a particular operation type is permitted, or (d) a particular object on which a particular operation type is permitted.

* * * * *